(12) United States Patent
Watanabe et al.

(10) Patent No.: US 8,422,350 B2
(45) Date of Patent: Apr. 16, 2013

(54) INFORMATION PROCESSOR DEVICE AND STORAGE MEDIUM

(75) Inventors: Takao Watanabe, Fuchu (JP); Yasunari Obuchi, Kodaira (JP); Masahiro Aoki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 13/126,326

(22) PCT Filed: Oct. 16, 2009

(86) PCT No.: PCT/JP2009/067912
§ 371 (c)(1),
(2), (4) Date: Apr. 27, 2011

(87) PCT Pub. No.: WO2010/050370
PCT Pub. Date: May 6, 2010

(65) Prior Publication Data
US 2011/0211436 A1    Sep. 1, 2011

(30) Foreign Application Priority Data
Oct. 30, 2008  (JP) ................................. 2008-279069

(51) Int. Cl.
*G11B 7/00* (2006.01)
(52) U.S. Cl.
USPC ...................................... 369/103; 369/112.23
(58) Field of Classification Search .................. 369/103, 369/112.01, 112.23, 112.24; 365/216; 359/1; 708/403, 821
See application file for complete search history.

(56) References Cited

U.S. PATENT DOCUMENTS

| | | | |
|---|---|---|---|
| 5,847,565 A | 12/1998 | Narayanan | |
| 6,088,321 A * | 7/2000 | Yamaji et al. | 369/103 |
| 6,950,382 B2 * | 9/2005 | Akselrod et al. | 369/103 |
| 7,315,636 B2 * | 1/2008 | Kuduvalli | 382/128 |
| 2005/0057787 A1 * | 3/2005 | Nakamura | 359/3 |

(Continued)

FOREIGN PATENT DOCUMENTS
JP   6-76374 A   3/1994
JP   11-102584 A   4/1999
(Continued)

OTHER PUBLICATIONS

Rosenfeld et al. "Digital Picture Processing", Computer Science and Applied Mathematics., Second Edition 1982, pp. 353-431, vol. 1, Section 8, Academic Press, Inc.

(Continued)

*Primary Examiner* — Thomas Alunkal
(74) *Attorney, Agent, or Firm* — Crowell & Moring LLP

(57) ABSTRACT

In an information storage device in which small partitions for storing information are three-dimensionally placed inside a solid, the invention aims at long-period storage, robustness, and rapid information reading. Accordingly, the stored three-dimensional information is divided into two-dimensional data for each layer, and two-dimensional inverse Fourier transform is previously applied for the two-dimensional data. The two-dimensional data is recorded in each layer in a Z direction inside a storage medium which is solid. When the information is reproduced, electromagnetic waves are irradiated to a storage area MA as gradually rotating the storage area MA around a z axis, and projection images of all layers during the rotation are obtained from response. By applying one-dimensional Fourier transform for a plurality of projection images obtained as described above, the recorded original three-dimensional information is rapidly reproduced.

9 Claims, 21 Drawing Sheets

U.S. PATENT DOCUMENTS

| | | | |
|---|---|---|---|
| 2005/0237896 A1* | 10/2005 | Tachibana et al. | 369/103 |
| 2006/0198275 A1* | 9/2006 | Kogure | 369/103 |
| 2006/0233087 A1* | 10/2006 | Usami | 369/103 |
| 2006/0285469 A1* | 12/2006 | Tonami | 369/103 |
| 2008/0310281 A1* | 12/2008 | Hara et al. | 369/103 |

FOREIGN PATENT DOCUMENTS

| | | |
|---|---|---|
| JP | 11-337756 A | 12/1999 |
| JP | 3011378 B2 | 2/2000 |
| JP | 2007-102878 A | 4/2007 |

OTHER PUBLICATIONS

Slichter, C.P. "Principles of Magnetic Resonance", Springer-Verlag, Third Edition 1990, pp. 1-65, Sections 1 and 2.

International Search Report with partial English translation dated Nov. 17, 2009 (three (3) pages).

Form PCT/ISA/237 dated Nov. 17, 2009 (three (3) pages).

* cited by examiner

FIG. 1A

Processing for data recording

STEP1:
Recording data of each layer is placed at the first quadrant of AX–AY plane

⇩

STEP2:
Data flipped over the axis of AX coordinate is placed in the fourth quadrant

⇩

STEP3:
The set of the data generated in the steps 1 and 2 is flipped over the axis of AY coordinate to place in the second and the third quadrants

⇩

STEP4:
Two-dimensional inverse Fourier transform is applied for the whole data and the resultant data is written as writing data of each layer

FIG. 1B

Processing for data reproducing

STEP1:
Obtaining projection images acquired during rotation for each layer of the storage medium

⇩

STEP2:
One-dimensional Fourier transform for each projection image

⇩

STEP3:
Placing of the data in the MX–MY two-dimensional plane

MA i

MA

MM

MA i

MA

MM

INFORMATION PROCESSOR DEVICE AND STORAGE MEDIUM

TECHNICAL FIELD

The present invention relates to an information processor device and a storage medium, and more particularly, the present invention relates to an information processor device and a storage medium in which high-density data recording and long-period storage of the data can be achieved by reading three-dimensionally recording data closed in a solid-like medium with contactless.

BACKGROUND ART

A high performance of a device for digital information such as image and voice has been rapidly progressed, and an information storage device for storing the digital information has been significantly progressed as the high performance progression. As a typical information storage device, a semiconductor memory, a hard disk, an optical disk, and others are cited. In these devices, components for storing the information are basically two-dimensionally placed, and high integration and low cost of the devices have been progressed as mainly relying on progression of a microfabrication technique so far. However, the progression of the microfabrication technique has been gradually difficult, and therefore, it is assumed that the rapid progression of the high integration and low cost is not as easy as used to be in future.

As one means for solving this problem, it is considered that storage components are not two-dimensionally but three-dimensionally placed. Such an example is described in the following documents. Patent Document 1 describes a read only memory card using multilayered optical waveguide in which planar-type optical waveguide is multilayered. Patent Document 2 describes a storage device for reading information with using cylindrical glass or plastic as a storage medium and using a computer tomography technique. Note that an eighth section of Non-Patent Document 1 describes principle of the computer tomography technique in detail. Also, Patent Document 3 describes an example of a three-dimensional memory with using resonance phenomenon of nuclear spin placed in magnetic field or others. Further, first and second sections of Non-Patent Document 2, 1 to 59 pages, explain the resonance phenomenon in magnetic field.

PRIOR ART DOCUMENTS

Patent Documents

Patent Document 1: Japanese Patent Application Laid-Open Publication No. H11-337756

Patent Document 2: Japanese Patent Application Laid-Open Publication No. H06-076374

Patent Document 3: Japanese Patent Application Laid-Open Publication No. H11-102584

Patent Document 4: U.S. Pat. No. 3,011,378

Non-Patent Documents

Non-Patent Document 1: Digital Picture Processing, Second Edition, Volume 1, Azriel Rosenfeld, and Avinash c. Kak, Academic Press Inc., section 8, p. 353 to 430

Non-Patent Document 2: C. P. Slichter, "Principles of Magnetic Resonance", 3rd edition, Springer-Verlag, 1990, Sections 1 and 2, p. 1 to 59

DISCLOSURE OF THE INVENTION

Problems to be Solved by the Invention

The Patent Document 1 describes the example of the read only memory card using the multilayered optical waveguide in which the planar-type optical waveguide is multilayered, and describes that a side surface of each layer is cut so that a cutting surface is inclined by 45 degrees with respect to a normal line of a plane of the waveguide. Also, as viewed from the normal line, the cutting surface of each layer is displaced so that the cutting surface is not overlapped with the other. Therefore, when light is irradiated from the normal line side (top surface of the multilayered waveguide planes) to the cutting surface of a selected layer, the light is reflected on the cutting surface, and is entered into the plane of the waveguide of the selected layer. The light entered into the selected waveguide plane is scattered by asperity formed in the waveguide. A position where the scattered light is generated is read as a two-dimensional pattern by a lens and a two-dimensional light receiving element. In this method, by matching a focus of the lens with the cutting surface, the pattern of the scattered light from the selected layer can be read.

However, when a layer away from the light receiving element is selected, the scattered light passes through a non-selected layer, and therefore, the light is absorbed in the non-selected layer and is scattered by asperity of the non-selected layer. When the number of layers is small, influence of the scattering is not a problem so much. However, when the number of layers is increased, intensity of the scattered light from the selected layer is decreased by the light absorption, and, on the other hand, the influence of the light scattering in the non-selected layer is increased. Therefore, an SN (signal-to-noise) ratio in the light receiving element is decreased, and there is a possibility that signals cannot be read.

Also, the Patent Document 2 describes an example with using a medium made of a cylindrical glass or plastic. It describes that information is stored inside the medium by three-dimensionally providing small partitions whose light transmissivity is different from each other. Although a specific description of how the light transmissivity in the small partitions is changed, that is, how the information is written, is not found out, the following method for the reading is described.

The laser beam is entered in a diameter direction of the cylindrical medium, and intensity of the laser beam is measured by a light-receiving unit placed on an opposite side. And, by rotating the cylindrical medium around a central axis of the cylindrical medium, the transmissivity is measured. Here, the central axis represents an axis passing through a center of a circle of the cylindrical medium. Based on the data of the transmitted light measured during one rotation as described above, each transmissivity of individual small partitions distributed on a cross-sectional circle is obtained by a calculation processing. It is described that, by performing this process as moving the cylinder in a rotation-axis direction, the information stored inside the cylinder is read. In the example of the Patent Document 2, since the laser beam is entered in the diameter direction of the cylinder, the problem that the SN ratio of the signal is decreased does not arise when a length of the cylinder in the rotation-axis direction is increased.

However, in a configuration of the example described in this document, the transmittance of all of the small partitions which are distributed inside the cross-sectional circle cannot be obtained by the calculation. This is because the light-emitting unit and the light-receiving unit of the laser beam are placed in the diameter direction of the cylinder. In this placement, even when the one rotation of the cylinder is performed, only the transmissivity in the diameter direction is measured. As known well, in computer tomography which obtains a cross-sectional structure by a calculation, not only the information of a line in the diameter direction passing through the center but also the transmissivity information of a plurality of lines parallel to the line is required.

Therefore, in the configuration described in the Patent Document 2, the data three-dimensionally distributed in the cylindrical medium cannot be correctly read. The eighth section of the Non-Patent Document 1 describes the principle of the computer tomography.

Note that, although not described in the Patent Document 2, it is considered that the laser beam is entered so as to be shifted from the center of the cylindrical medium in order to obtain the cross-sectional structure by the computer tomography technique. However, in the configuration of the Patent Document 2, even if the transmissivity of light rays parallel to the diameter required for the computer tomography is tried to be measured, when the laser beam is entered into a position away from the center, an optical path is largely bent on a surface of the cylinder due to light refraction because the medium has the cylinder shape and the incident light is the laser beam, and therefore, correct information may not be obtained.

From the above descriptions, by the example described in the Patent Document 2 or easy-analogical consideration, the correct cross-sectional information may not be obtained with using the principle of the computer tomography. Further, the Patent Document 2 does not teach a method of writing the data into the storage medium.

The Patent Document 3 describes to use liquid water or solid polymethylmethacrylate as the storage medium. In this method, by applying three-dimensional gradient magnetic field to a uniform storage medium such as water, a resonant frequency is controlled, and electromagnetic waves having locally-different frequencies are absorbed, so that the data is written. The data is read by reading the electromagnetic waves emitted from hydrogen atom or others within relaxation time of the resonant phenomenon. It seems that this method is more advantageous for the high integration than that of a prior two-dimensional information storage device because of using a three-dimensional space. However, in this method, there are problems such that the relaxation time passes over before reading the data and the storage information disappears when application of external magnetic field is turned off or when the medium is brought to an environment without the magnetic field.

As described above, in the prior information storage device, there are problems in the reading of the three-dimensional information and retention of the information, and sufficient consideration for long-period storage of information has not been made.

As taking the above descriptions into consideration, the inventors have studied on a three-dimensional information storage device with using computer tomography, MRI, or others. As a result, the inventors have considered that, in addition to solve the basic problems in the above-described Patent Documents, consideration for reducing a calculation amount of reading and reproducing the information to improve a speed is required.

The present invention is made as considering such problems. The above and other preferred aims and novel characteristics of the present invention will be apparent from the description of the present specification and the accompanying drawings.

Means for Solving the Problems

The typical ones of the inventions disclosed in the present application will be briefly described as follows.

The information is closed by three-dimensionally writing the information in a solid. In an information storage area, a plurality of memory cells for storing data are placed based on transmissivity of electromagnetic waves irradiated from an outside, light emission after the irradiation, or echo characteristic. The memory cells are three-dimensionally placed to form a plurality of layers in the storage medium. In the memory cell of each layer, a content corresponding to data obtained by applying two-dimensional inverse Fourier transform for information to be recorded is recorded. In the reading of the recorded information, the reproducing is performed by calculations including one-dimensional Fourier transform for projection images acquired during rotation of the data stored in the memory cell of each layer.

Other solving means will become clear by reference of best mode for carrying out the invention.

EFFECTS OF THE INVENTION

The effects obtained by typical aspects of the present invention disclosed in the present application will be briefly described below. In reading and reproducing the information three-dimensionally recorded in the solid, the recorded information on the two-dimensional tomographic surface can be reproduced by a method with high parallelism and small calculation amount.

BRIEF DESCRIPTIONS OF THE DRAWINGS

FIGS. 1A and 1B are examples showing calculation processing methods of recording and reproducing information according to the present invention;

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted. Also, the drawings and descriptions of the present invention are simplified in order to illustrate components required for understanding the present invention clearly, and, at the same time, other components which seem to be already known are eliminated for simplification. It could have been understood, by those who skilled in the art, that other components not illustrated are desirable or required for implementation of the present invention. However, such components are already known in the corresponding technique and are not for help of further understanding of the present invention, and therefore, such components are not described in the present specification.

Figure 2:
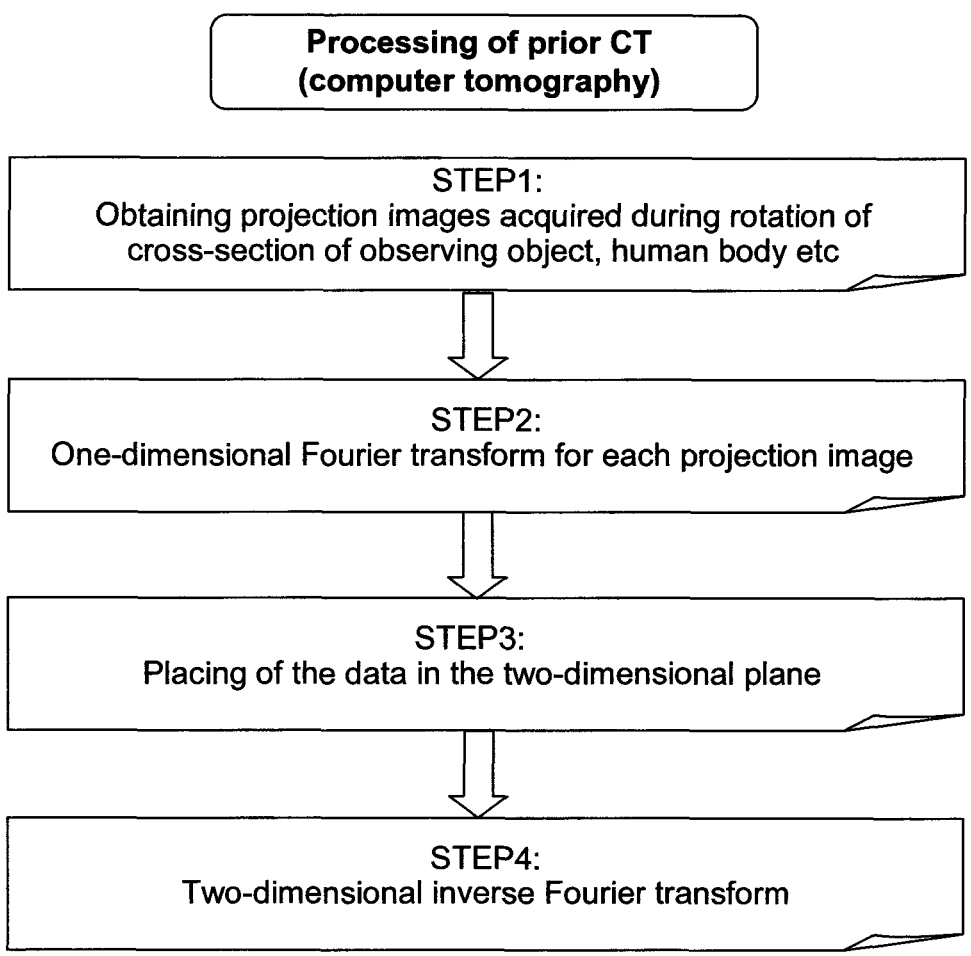
FIG. 2 is an example showing a calculation processing method of prior computer tomography.

FIGS. 1A and 1B are examples showing calculation principles of recording and reproducing information according to the present invention. For comparison, FIG. 2 shows a calculation principle of computer tomography (CT) used for general tomography. The computer tomography has various modifications called inverse radon transform, back projection, filtered back projection, or others. FIG. 2 shows the most general principle. The tomography of human body with using X rays or others is also based on the principle of FIG. 2. Note that, when X rays are used, the light beam from a radiation source is outputted in a fan shape (fan beam), and therefore, correction for the shape or others is required. However, the correction is omitted in FIG. 2. For the detailed correction, the eighth section of the Non-Patent Document 1 and others are referred. As shown in FIG. 2, in the general computer tomography, the following processing is performed.

(Step 1)
A cross-sectional projection image to be observed acquired during rotation is obtained by gradually rotating a human body or an imaging apparatus for one rotation.

(Step 2)
Next, one-dimensional Fourier transform is applied for the projection images acquired during the rotation at each angle.

(Step 3)
A result of the one-dimensional Fourier transform obtained in the STEP 2 is placed at an angle corresponding to a rotation angle on a two-dimensional plane.

(Step 4)
Two-dimensional inverse Fourier transform is applied for the data on the two-dimensional plane of the STEP 3.

Results obtained by the above-described processing become planar cross-sectional image of the projection images acquired during the rotation in the STEP 1. Note that, practically, a filter process or others is applied for the results for interpolation and noise reduction. However, the process or others is omitted in the above descriptions. As described above, in the general computer tomography, after obtaining the projection images acquired during the rotation, it is required to apply not only the one-dimensional Fourier transform but also the two-dimensional inverse Fourier transform for the projection image obtained at each angle. Therefore, calculation amounts for the processes are adversely significantly large. In the tomography of the human body, human-body inside cannot be previously treated for easily performing the tomography. However, since the present invention aims at recording the information, a method of recording the data is previously devised to reduce the calculation amounts at the reproducing.

Next, with reference to FIGS. 1A and 1B, an example of the principle is described. FIG. 1A shows a processing method for the data recording, and FIG. 1B shows a processing method for the data reproducing. First, for the data recording, the following processing is applied for each layer of the three-dimensional data.

(Step 1)
The data to be recorded in each layer is placed at a first quadrant of an AX-AY plane. Here, a reason why the AX-AY plane is distinguished from an X-Y plane by adding a symbol "A" is because this coordinate is used in the middle of the calculation processing at the recording, and it is required to distinguish this coordinate from a coordinate for the calculation processing at the reproducing and a coordinate of the practical medium. Hereinafter, the symbol "A" is added to the coordinate used for the calculation processing at the recording as "AX" and "AY", a symbol "M" is added to the coordinate used for the calculation processing at the reproducing as "MX" and "MY", and anything special is not added to a physical coordinate of the medium as "X" and "Y".

(Step 2)
The data flipped over an axis of AX coordinate is placed in a fourth quadrant.

(Step 3)
A set of the data in the first and fourth quadrants is flipped over an axis of AY coordinate to be placed in second and third quadrants.

(Step 4)
The two-dimensional inverse Fourier transform is applied for the data on a two-dimensional plane placed from the STEP 1 to STEP 3, the data is developed on an axis of X-Y coordinate, and a resultant data is written into the storage medium as a data of one layer.

Subsequently, the data is reproduced as shown in FIG. 1B.

(Step 1)
The electromagnetic waves are irradiated to each reproduced cross-sectional surface to obtain projection images of each cross-sectional surface acquired during the rotation as gradually rotating the storage medium or the imaging apparatus for one rotation.

(Step 2)

Next, the one-dimensional Fourier transform is applied for the projection image during the rotation at each angle.

(Step 3)

A result data of the one-dimensional Fourier transform obtained in the STEP 2 is placed in an MX-MY two-dimensional plane at an angle corresponding to the rotation angle for each layer. The data placed on the MX-MY two-dimensional plane corresponds to the placement of the data on the AX-AY in the STEP 3 of FIG. 1A and a density of the data. Note that the placement and a density of the data placed on the MX-MY two-dimensional plane are not necessarily completely the same as those of the data placed on the AX-AY two-dimensional plane, and the data placed on the AX-AY can be read as long as relations in a relative position and a relative density of each data to the other are maintained.

As described above, according to the example of FIG. 1, the two-dimensional inverse Fourier transform is not required at the reproducing the recorded data, and the calculation amount at the reproducing is reduced, and therefore, the rapid reproducing is achieved. Since the present invention aims at the long-period storage of information and others, the recording is not frequently performed. Therefore, it is important to rapidly reproduce the information.

Hereinafter, with reference to the example of FIG. 1, a theory of why the recorded data can be reproduced is explained. The explanation is made based on an assumption of a basic principle of the normal computer tomography of FIG. 2, and therefore, the detailed mathematical expressions for the Fourier transform are omitted. For them, the eighth section of the Non-Patent Document 1 or other documents related to a computer tomography is referred.

In the comparison of the reproducing processing shown in FIG. 1B of the present invention with the processing in FIG. 2 which is for the normal tomography, the two-dimensional inverse Fourier transform at a last step of FIG. 2 is eliminated in the reproducing processing of FIG. 1B. It is easily found out that the data before applying the two-dimensional inverse Fourier transform at the last step of FIG. 2 for the prior tomography is the same data obtained by applying the two-dimensional Fourier transform for tomography images. That is, a resultant data obtained by previously applying the two-dimensional inverse Fourier transform for the recorded data as shown in FIG. 1, recording the data in the storage medium, and applying the processing until before the last step of FIG. 2 for the data becomes the same data obtained by applying the Fourier transform for the recorded data in the medium. Therefore, the data obtained by the reproducing processing of FIG. 2 is the originally-recorded information. As described above, according to the example of FIG. 1, the two-dimensional inverse Fourier transform at the reproducing can be eliminated.

Also, in the recording processing shown in FIG. 1A, the recorded data is flipped over upward/downward and leftward/rightward by the STEP 1 to the STEP 3. The flipping over is a processing for placing the data before applying the two-dimensional inverse Fourier transform of the STEP 4 in an even function. The above-described processing aims at not containing imaginary parts in the data written in the storage medium. That is, when the two-dimensional inverse Fourier transform is applied for the data on the above-described AX-AY plane in the STEP 4, if the data obtained before applying the inverse transform is line-symmetric on the AX-AY plane, the data obtained after applying the inverse transform is a real number. Obviously, when only the data which is line-symmetric on left, right, top, and bottom over the AX and AY axes is recorded, this processing is essentially not required. However, by performing this processing, limitation of the symmetry of the recorded data can be eliminated.

By this processing, a data volume is increased as much as 4 times an original volume, and therefore, a recording density is decreased. However, there are two merits for data reliability. One of them is that, since the data is recorded in the storage medium after applying the inverse Fourier transform, the data is spatially distributed, and therefore, the data is resistant to local data corruption and reproducing error. The other one is that, since the reproduced data is to be line-symmetric over the AX and AY axes, the data error can be corrected by a help of the line symmetry. For example, among four points of the data of the reproduced layer which are line-symmetrically positioned over the AX and AY axes, when three points of them are the same as each other and one point thereof is different from the other, the data of the same three points may be the reproducing result.

Figure 3:
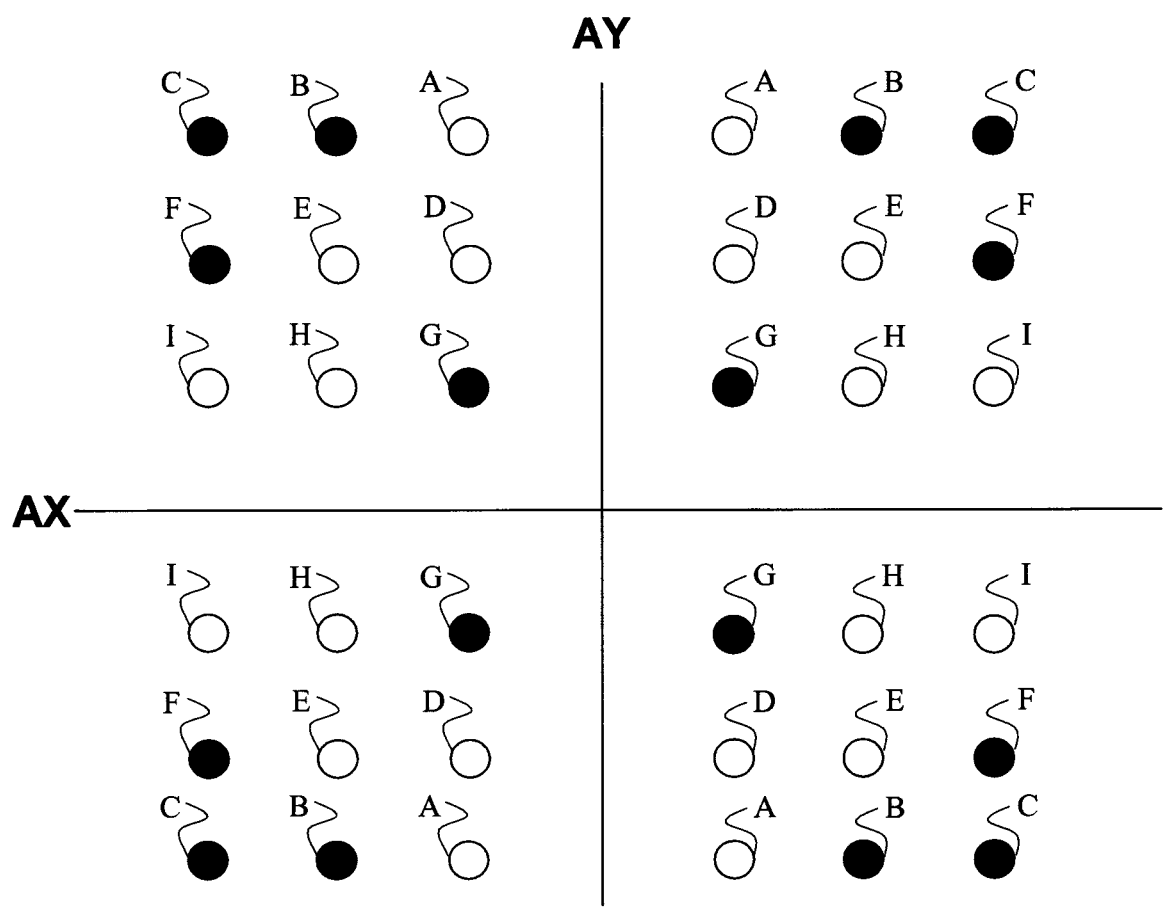
FIG. 3 is a first example of data placement during the calculation in the recording of the present invention.

With reference to an example of FIG. 3, the devisal for generating the above-described line-symmetric data over the AX and AY axes is understandably explained. In FIG. 3, white dots (A, D, E, H, and I) and black dots (B, C, F, and G) represent the originally-recorded data. The write dots correspond to information "1", and the black dots correspond to information "0". Note that the present invention is effective for not only such discrete data but also continuous data, and besides, the present invention can be also used when multiple values are represented by one dot even when the data is discrete but not binary. However, in the present example, the above-described example is explained for simplifying the explanation.

In FIG. 3, the originally-recorded data is nine dots in a first quadrant, and the data in rest of quadrants is represented by additional dots so that the data becomes the real number when the two-dimensional inverse Fourier transform is applied for the data. Note that, as described above with reference to FIG. 1A, the line-symmetric data of FIG. 3 is not directly stored in the storage medium, but the data obtained by applying the two-dimensional inverse Fourier transform for the line-symmetric data is recorded in a desirable layer of the storage medium. In FIG. 3, the dots are placed in a lattice formation. By this formation, each position of the data can be simply expressed by the AX and AY coordinates which are at right angles to each other. When an address of the storage data is corresponded to the position of the dot, the position can be expressed by the orthogonal coordinates, and therefore, the placement is convenient.

Figure 4:
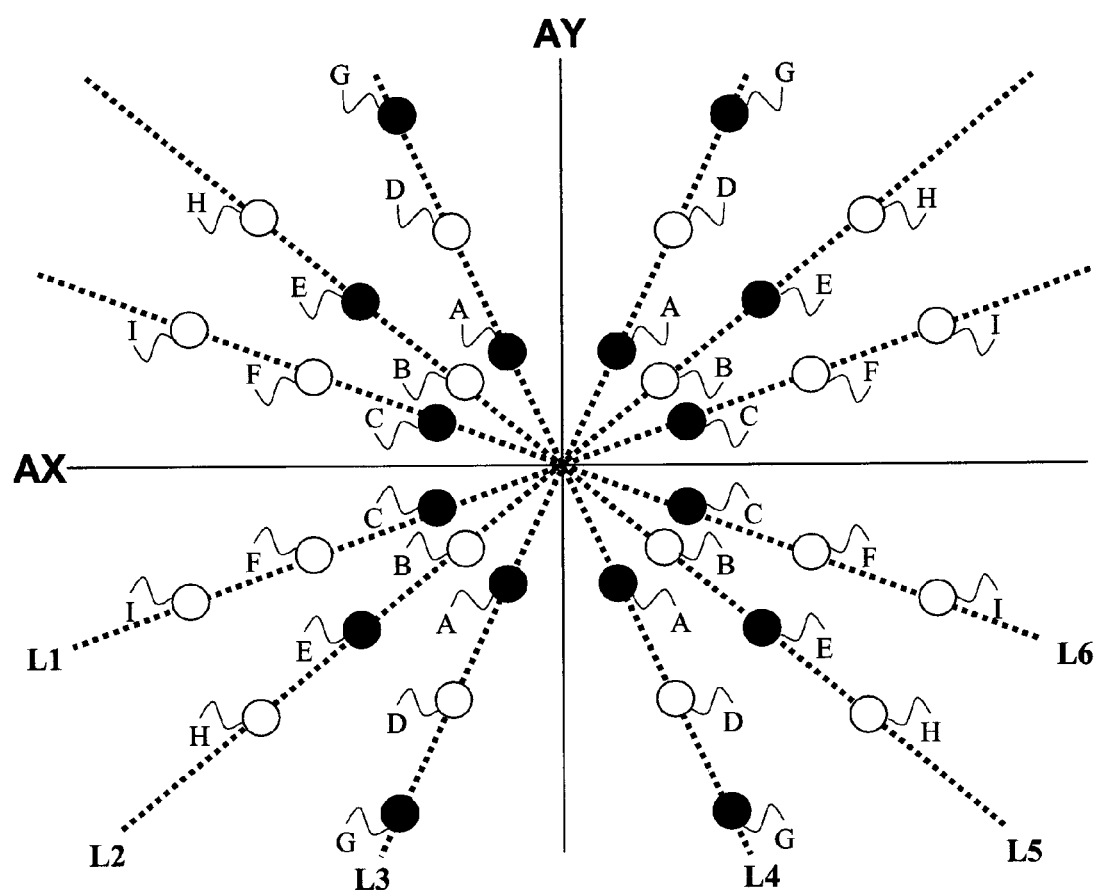
FIG. 4 is a second example of the data placement during the calculation in the recording of the present invention.

On the other hand, placement as illustrated in FIG. 4 is also possible. In the placement, the dots are placed on a line radially extending from origins of the AX and AY coordinates. In the example of FIG. 4, the coordinate of the data can be expressed by an angle from the AX axis and a distance from the origin. That is, the address can be controlled by polar coordinates. In the placement as illustrated in FIG. 4, there are the following merits. As described above, in the STEP 3 for the reproducing processing in FIG. 1B, the resultant data of the one-dimensional Fourier transform obtained in the STEP 2 is placed at an angle on the two-dimensional plane corresponding to the rotation angle at which the projection images acquired during the rotation are obtained. Therefore, with using the placement of FIG. 4, by acquiring the projection images at an angle right crossing a line (dotted line on FIG. 4) when the projection images acquired during the rotation is obtained, the data obtained after applying the one-dimensional Fourier transform which is placed in the STEP 3 at the reproducing is matched with the original data placed on the line. Therefore, among the storage data formed of only the projection images at specific angles, the corresponding data can be reproduced. Also, in a case of reproducing the whole storage data, the projection images for the stored number of angles only have to be obtained, and therefore, the number of the projection images acquired during the rotation can be reduced. Further, time and effort such that the data between two angles is calculated for the interpolation and is corrected after the STEP 3 at the reproducing can be reduced. Note that, in the above explanation, the specific layer is explained for simplicity. However, it is needless to say that a plurality of layers or all layers are parallely processed at the same time, so that higher speed is achieved. In this case, by recording the data of each sheet of documents or photographs with using the plurality of layers at the specific angle, the data can be restored from one projection image, and therefore, the case is convenient.

Figure 5A:
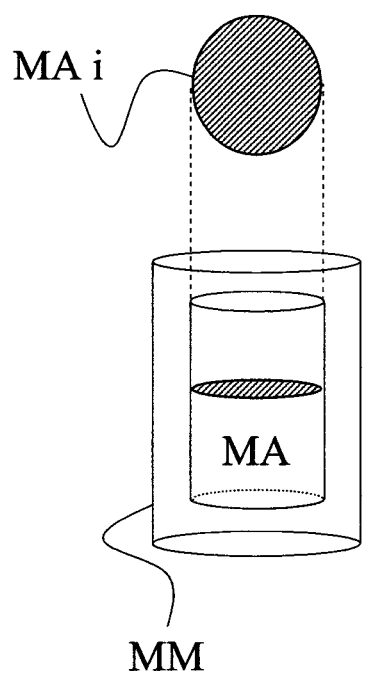
FIGS. 5A and 5B are views illustrating an example of a shape of a storage medium of the present invention.
Figure 5B:
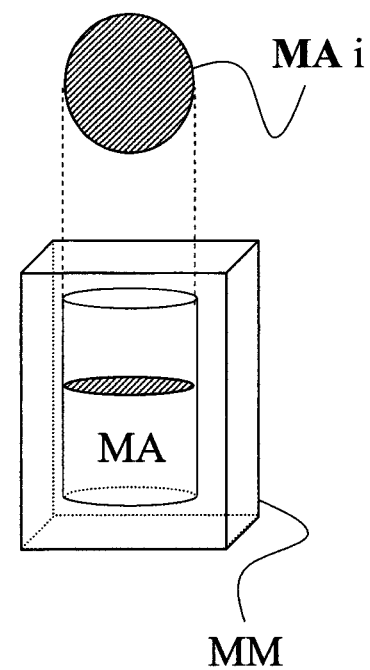

In the foregoing, the recording and reproducing processing of the data have been mainly explained with reference to the examples. Next, an explanation of how the data three-dimensionally formed of a plurality of layers is placed in a practical storage medium is made with reference to an example. First, FIGS. 5A and 5B illustrate a variation in a shape of the storage medium. In FIGS. 5A and 5B, the symbol "MM" represents the storage medium, and the symbol "MA" represents the area for recording the data inside the storage medium. In the MA, the three-dimensional data is recorded. A symbol "MAi" represents two-dimensional data of an i-th layer inside the MA. Note that, in the example, a cylinder and a quadratic prim are exemplified. However, it is needless to say that, in additional to them, various variations such as a plate shape and a polygonal shape are possible. In the cases of the plate shape and the polygonal shape, there is a merit that they are difficult to roll more than the cylinder when they are placed on a table or others.

When X rays are used as the irradiated electromagnetic waves for obtaining the projection images acquired during the rotation, the shape of the storage medium MM is not a problem so much because straightness of the X rays is strong. However, when light having a longer wavelength than that of X rays, more specifically, visible light or others is used, it is required to obtain the projection images acquired during the rotation as taking the influence of the refraction due to the shape of the medium into consideration. While the case of the cylinder is described later, even in the cases of the plate shape and the polygonal shape, change of the optical path due to the refraction can be calculated for each rotation angle if the refractive index and the shape of the medium are found out, and therefore, various shapes can be used for the medium.

Note that, in the cases of the plate shape and the polygonal shape, it is difficult to image the projection image at a corner portion. Even in the cylinder, an angle at which the projection image cannot be imaged may exist due to interruption such as a pillar for supporting the medium. In this case, it is difficult to increase spatial resolution in a direction right crossing the non-imaged direction, and therefore, restriction so that detailed data is not provided in such a direction may be previously set at the writing.

Figure 6A:
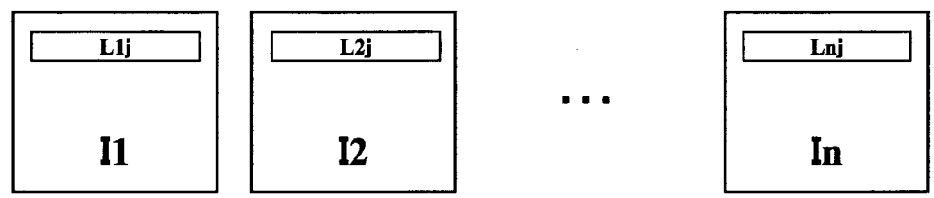
FIGS. 6A and 6B are an example illustrating a method suitable for recording a plurality of pieces of two-dimensional data.
Figure 6B:
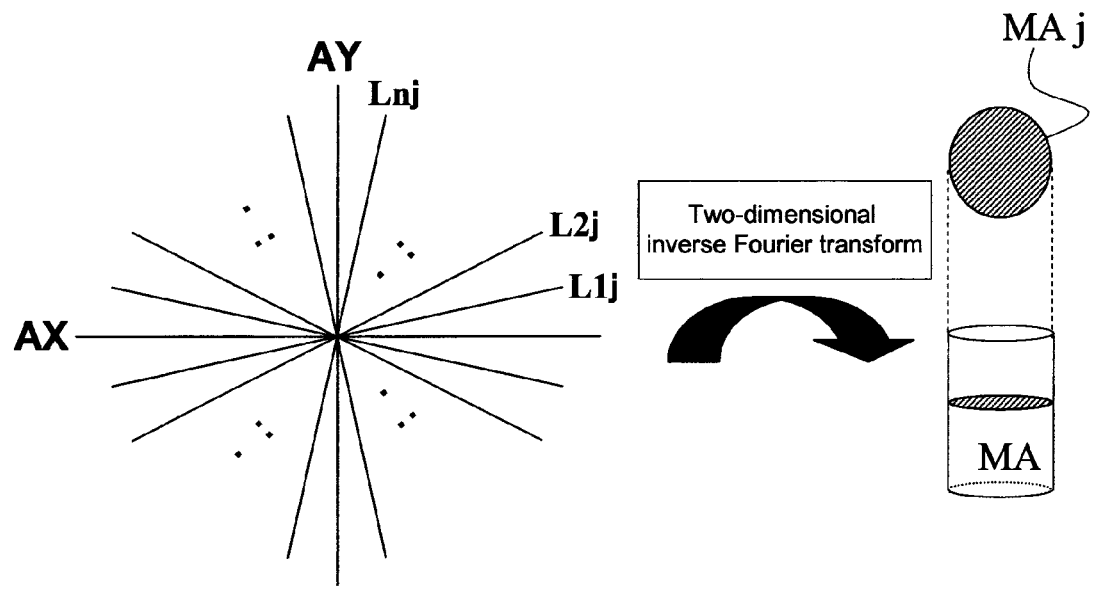

FIGS. 6A and 6B illustrate an example suitable for recording a plurality of pieces of two-dimensional data such as images and photographs. The present example has a feature that one sheet of the two-dimensional data can be reproduced only by simultaneously imaging the projection image at the specific angle over a plurality of layers. The j-th row of the two-dimensional data is illustrated. FIG. 6A illustrates the plurality of pieces of recorded two-dimensional data "I1", "I2", . . . "In". Here, symbols "L1j", "L2j", and "Lnj" represent a j-th row of the respective two-dimensional data. These data of these rows are collected, and are placed as illustrated in FIG. 6B. The two-dimensional inverse Fourier transform is applied for these data, and these data are recorded in the respective j-th layer of the storage area MA. In this manner, the projection images of all layers are acquired at the specific angle, the one-dimensional Fourier transform is applied for each layer, and results of a first layer, a second layer, and . . . are placed on a first row, a second row, and . . . , respectively, so that the placed results become the two-dimensional data corresponding to the angle. Note that the specific angle is described here. For example, in order to reproduce the second two-dimensional data in FIGS. 6A and 6B, the projection image may be obtained from a direction right crossing an angle made by the L2j and the AX axis in FIG. 6B.

As described above, according to the example of FIGS. 6A and 6B, the two-dimensional inverse Fourier transform is not required at the reproducing the information, and besides, the one sheet of the two-dimensional image can be reproduced by only applying the one-dimensional Fourier transform for the projection images of the plurality of layers obtained at the specific angle. That is, since the two-dimensional data can be continuously reproduced as gradually rotating the storage medium, this reproducing method is suitable for reproducing, for example, movies or others. Note that, in the examples described above, since the resultant data obtained after applying the two-dimensional inverse Fourier transform is recorded, it is required to express multibit values containing negative numbers.

Hereinafter, a recording example with using light absorption, light emission, or resonance echo of electromagnetic waves is described. In such an example, it is easy to continuously control an amount of absorption, an amount of luminescence, or a resonant frequency, and therefore, such an example is suitable for recording the multibit values. Also, for the negative number, if an intermediate value of an expressible dynamic range is defined as zero, the negative number can be substantially expressed by subtracting the negative value when the projection image is obtained. Note that, when a dynamic range of an expressible value is insufficient or accuracy is insufficient in one storage area, the dynamic range can be obviously widened with using a plurality of storage areas, and besides, the most suitable expression for the negative number can be selected because a lot of methods for the expression are known. Various handling methods for these manners can be generally considered by engineers for the light or electromagnetic wave technology, and therefore, the methods are not described in detail hereinafter.

Figure 7:
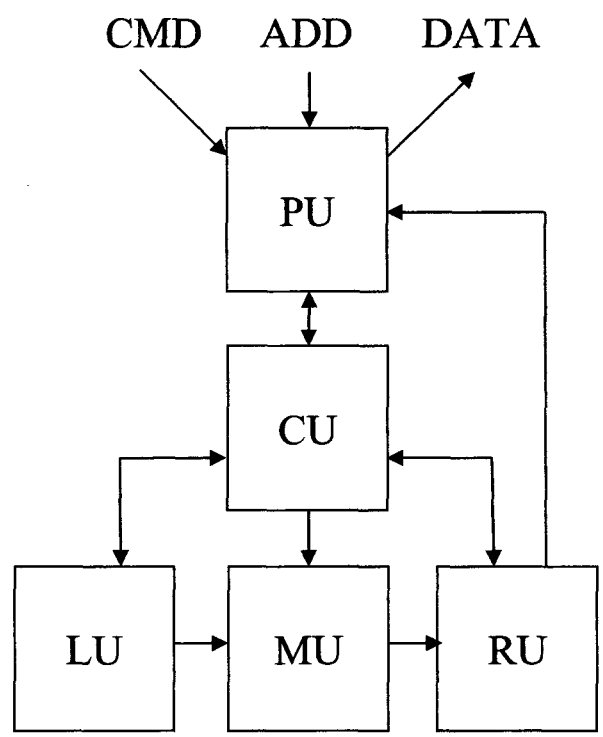
FIG. 7 is a block diagram illustrating a first example of a configuration of an information storage device of the present invention.
Figure 8:
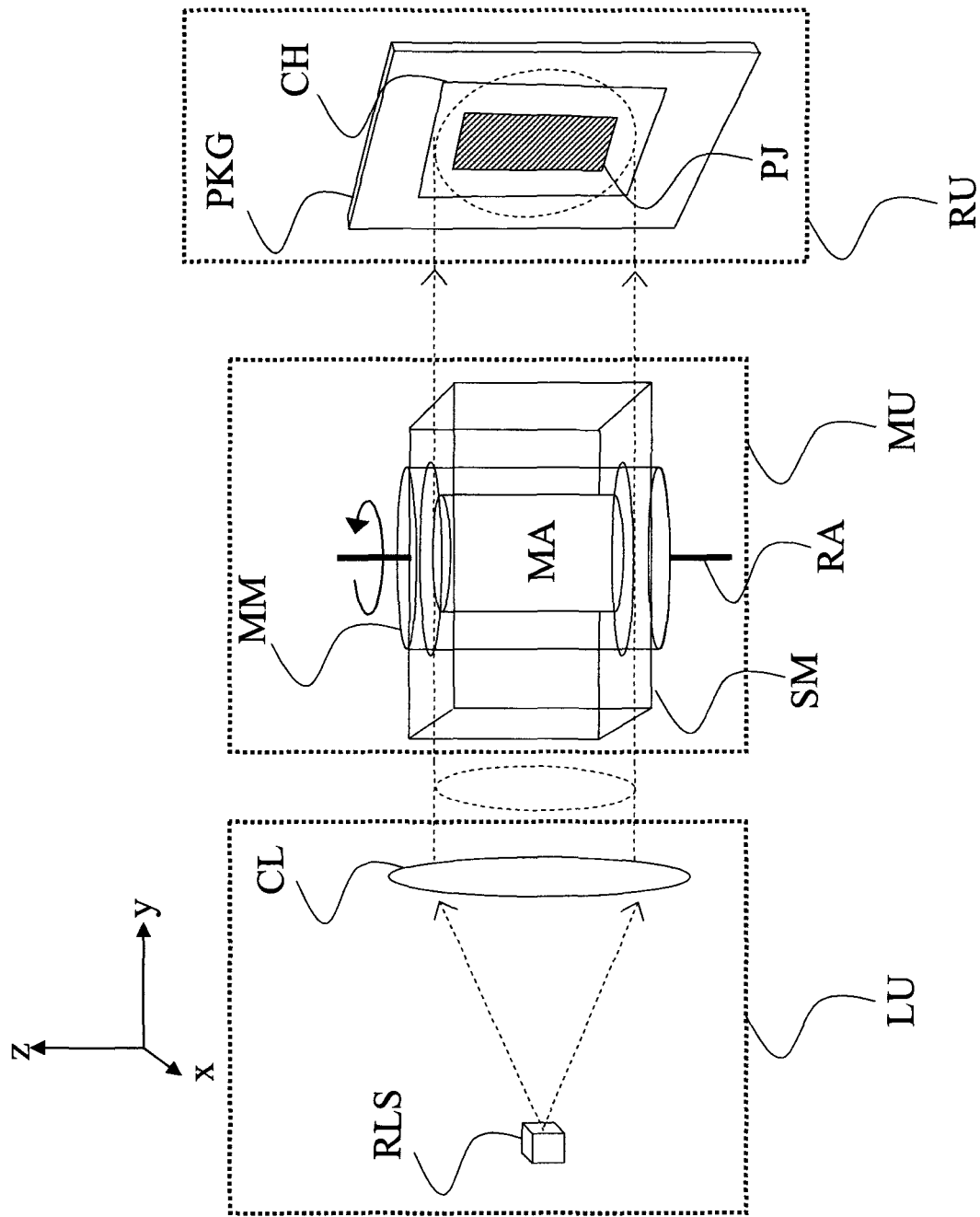
FIG. 8 is an example illustrating a perspective view of principal components of FIG. 7.

FIGS. 7 and 8 illustrate a first example of a configuration of an information storage device of the present invention. FIG. 7 illustrates a block diagram of principal components (hereinafter, each referred to as unit) in the present example, and FIG. 8 illustrates a perspective view of a specific configuration example. Note that a "y" axis in FIG. 8 represents an axis heading from a lighting unit "LU" toward a receiving unit "RU", and an "x" axis therein represents an axis vertical to a paper of the specification. Hereinafter, the descriptions are the same unless specifically stated.

In FIG. 7, a symbol "MU" represents a memory unit, and stores the data in a partition separated by a three-dimensional address as a difference of transmissivity of the light. A symbol "LU" represents a lighting unit, and a symbol "RU" represents a receiving unit. The light is irradiated to the memory unit MU by the lighting unit LU to image the projection images required for the calculation for the computer tomography by the receiving unit RU. A symbol "CU" represents a control unit, and controls the rotation, up and down movement, and others of the storage medium in the MU. A symbol "PU" represents a calculating unit, and processes the signals of the data of the projection images provided from the receiving unit RU based on the principle of the computer tomography and calculates the placement of the recorded data in the memory unit MU and the value of the data. In the present example, when a three-dimensional address region "ADD" and a command "CMD" are inputted from outside to the calculating unit PU, the control unit CU controls the lighting unit LU, the memory unit MU, and the receiving unit RU, so that the plurality of projection images are imaged by the receiving unit RU as described later, and the data values inside the memory unit MU corresponding to the inputted address regions are obtained by the calculation in accordance with the principle of the computer tomography and are outputted. Arrows illustrated in this block diagram represent flows of the data, control signals, and others among blocks each described above.

With reference to FIG. 8, specific operations are described. This figure illustrates a configuration example of the above-described plurality of units except for the CU and the PU as a perspective view. A feature of the present example is to use not X rays which are used for the tomography for a human body but ultraviolet rays or safe light having a longer wavelength. First, the storage medium MM formed of a column-shaped transparent material is inserted into a through-hole formed in a supporting medium "SM" which is shaped in cuboid and is transparent. These parts correspond to the memory unit MU. As the material of the above-described supporting medium SM and storage medium MM, for example, glass or an organic substance such as transparent plastic can be used. Since these materials have high transmissivity for the light having a wide wavelength, they are suitable for the present example with using the light. While the plastic is right and is superior to the glass in impact resistance, the glass is generally superior in long-period storage, and therefore, they can be selected depending on their use conditions. Note that, among various types of the glass, fused silica has small coefficient of thermal expansion and high transmissivity in a wide wavelength range from infrared rays to ultraviolet rays. Therefore, it is difficult to cause the reading error by the expansion due to temperature change, and the fused silica can be endured for a rapid temperature change situation such as on fire. Therefore, the fused silica is suitable for the material of the supporting medium SM and the storage medium MM in the present invention.

Also, depending on cases, it is considered to require a material being harder and more resistant to a high temperature than the fused silica. In those cases, for example, sapphire, that is aluminum oxide crystal, can be also used. An artificial transparent crystal made of aluminum oxide is the second hardest following diamond, and its melting point is also over 2000° C. Therefore, the supporting medium SM and the storage medium MM which are harder and more resistant to the high temperature than the fused silica can be manufactured.

Here, the cylindrical-shaped area MA inside the storage medium MM is the storage area in which a plurality of small areas are three-dimensionally distributed.

As illustrated in FIG. 8, the above-described lighting unit LU is configured with a reading point light source "RLS" and a collimation lens "CL". The reading point light source RLS is positioned at a focus of the collimation lens CL. In this manner, the parallel rays are outputted from the collimation lens, and the images required for the computer tomography can be imaged. Note that, as seen from FIG. 8, the parallel rays are cylindrical-shaped light rays whose diameter is a size of the collimation lens, and is parallel to a light axis ("y" axis) connecting between the focus of the collimation lens and a center thereof and is vertical to a "z-x" plane in FIG. 8. The light rays enter vertically into a surface opposite to the collimation lens (surface parallel to the z-x plane) among side surfaces of the supporting medium SM.

In the reading point light source RLS, a luminous body is stored in a shielding object on which micro holes (pinholes) are opened. As required, a lens for focusing the light rays from the luminous body may be embedded inside. As the luminous body, a substance having a wavelength suitable for identifying the light transmissivity of the small area is used. Note that, in a case of using a substance emitting the light having a plurality of wavelengths as the luminous body, a problem such as chromatic aberration of the lens may arise due to the unnecessary wavelengths when the projection images are imaged. In that case, as required, an achromatic lens or an apochromatic lens whose chromatic aberration is corrected may be used as the collimation lens CL, or a filter for cutting the light having the unnecessary wavelengths may be equipped on the lighting unit LU or the receiving unit RU. Note that, as the collimation lens CL, a lens system configured with a plurality of lenses such as an aspheric lens or others may be used for correcting aberration except for the chromatic aberration as required.

As an example of the light source, an LED light source or others can be used. The LED light source has merits of low heat generation and low power consumption. It is needless to say that the filter can be used as described above for extracting the light having a specific wavelength from the LED light. Note that, when light intensity of the LED light source is insufficient, a xenon lamp, a mercury lamp, or others may be arbitrarily applied. Also, in the present example or examples described below, figures are illustrated with omitting a shielding cover, cloth, and others for cutting excess light entered from the outside into the device. However, it is needless to say to take actions for not entering the excess light such that shielding means are used or a whole room where the device of the example is placed is made as a darkroom.

The parallel rays generated in the lighting unit as described above are entered into the side surface of the supporting medium SM as illustrated in FIG. 8, and then, is outputted from an opposite side surface of the SM through the storage medium MM, and is inputted into an image chip "CH". In this manner, one projection image "PJ1" of the storage area MA inside the storage medium MM can be imaged.

Note that the light inputted into the image chip at this time is the parallel rays already having passed through the storage area MA. Here, the supporting medium SM is shaped in prism (cuboid in the present example) and its one side surface is parallel to the z-x plane, and therefore, the parallel rays outputted from the collimation lens CL can be transmitted straight to the storage medium MM without refraction of the parallel rays. Also, a space between the supporting medium SM and the storage medium MM may be decreased as long as the rotation is not prevented in order to decrease influence of the refraction in this space. Further, in the supporting medium SM and the storage medium MM, it is effective to design a curvature of a curved surface through which the light passes as small as possible for decreasing the influence of aberration such as decreasing the influence of refraction because an angle made by the light and an interface becomes close to a right angle. Still further, inside the space, it is also effective to fill a fluid such as oil whose refractive index is close to those of the materials of the supporting medium SM and the storage medium MM for decreasing influence of scratches of the interface, less accuracy of surfaces, or refraction on the surfaces. That is, when an absolute value of a difference in the refractive index between the supporting medium SM and the fluid is smaller than that of a difference in the refractive index between the supporting medium SM and air, and beside, an absolute value of a difference in the refractive index between the storage medium MM and the fluid is smaller than that of a difference in the refractive index between the storage medium MM and air, the influence of refraction can be decreased.

Here, the example of using the cylinder for the storage medium MM has been described. By using the cylinder, the space between the supporting medium SM and the storage medium MM can be uniformed in all positions, and besides, the space between the supporting medium SM and the storage medium MM can be decreased.

Subsequently, as gradually rotating the storage medium MM around a rotation axis "RA", projection images are further imaged. In this manner, by rotating the storage medium MM for one rotation, the data required for the calculation for the computer tomography is collected. If the data can be obtained, the cross-sectional shape of the storage medium, that is the distribution of the memory cells, can be calculated by the calculating unit PU based on the principle of the computer tomography.

In the present example, the projection images can be imaged by the parallel rays. Therefore, as compared with the case of obtaining the projection images by the fan beam generated by X rays, there is a merit of a small calculation amount. The details of the calculations for the computer tomography by the parallel rays and the computer tomography by the X-ray fan beam are described in the Non-Patent Document 1.

As described above, in the present example, the data can be reproduced with using the principle of the normal computer tomography. However, by recording the data in the storage medium MM after the processing as shown in FIG. 1A, the two-dimensional inverse Fourier transform at the reproducing is not required. In this case, at the reproducing, the calculations as shown in FIG. 1B only have to be performed by the calculating unit PU. That is, after the STEP 1 in which the projection images acquired during the rotation for each reproduced cross-sectional surface is obtained for one rotation, the one-dimensional Fourier transform is applied first (STEP 2) for the projection images acquired during the rotation at each angle by the calculating unit PU. Further, by the calculating unit PU, the resultant data of the one-dimensional Fourier transform obtained in the STEP 2 is placed (STEP 3) on the MX-MY two-dimensional plane at an angle corresponding to the rotation angle for each layer. The relative position of each dot placed on the MX-MY two-dimensional plane is the address, and a density of the dot is the data value. Still further, the data obtained as described in FIG. 1 is as obtained by line-symmetrically placing the four pieces of originally-recorded data over the AX and AY axes. In this manner, the data can be reproduced without applying the two-dimensional inverse Fourier transform. Therefore, the rapid reproducing can be achieved by the reduction of the calculation amount.

Since the projection images of the storage area MA are stored in the image chip in the present example, it is not required to move the storage medium MM up and down. By this configuration, a configuration of the control unit can be simplified when the storage medium is to be small. It is needless to say that, when a long-shaped MA in an RA axis (z direction) is used, the storage medium only has to be moved in the RA-axis direction. Here, two-dimensional arranged pixels are used for the image chip, and therefore, the storage medium only has to be moved by a distance within a range of the pixels of the image chip in the z direction as one moving distance.

Note that, in FIGS. 7 and 8, with using the point light source for the RLS, the parallel rays are obtained by entering the light from the RLS into the circular-shaped collimation lens CL. Also, the projection images of the MA obtained by the above-described light rays are imaged by the two-dimensional image chip CH. However, the present invention is not limited to this. For example, in a case that a priority is given to the cost more than the reading time, the imaging may be performed as moving the storage medium along the RA axis for each rotation with using a lens which is thin in the z direction and an image chip which is one-dimensional line sensor type. Also, with using a slit-shaped light source extending in the z direction for the RLS and using a cylindrical lens extending in the z direction for the collimation lens CL, the parallel rays can be generated. When parallel rays which are long in the z direction are required, the case with using the slit-shaped light source and the cylindrical lens may cost lower than a case with using a circular-shaped large lens.

Further, since the projection images of the whole storage area MA are stored in an imaging element in the present example, a cross-sectional surface of an arbitrary Z point in the MA can be calculated by acquiring the data for the one rotation. However, depending on cases, only distribution information of the memory cells in a part of z points in the MA may be required. In such a case, among the data of the projection images acquired during rotation in all z values, it is needless to say that the data obtained by passing the light through the area where the data is to be obtained only has to be stored.

In the foregoing, with reference to FIGS. 7 and 8, the example of the information storage device in which the data three-dimensionally placed in the storage medium can be read has been described. According to the description, by rotating the storage medium MM only for one rotation, the three-dimensional data can be rapidly reproduced. Since the data is three-dimensionally recorded in the storage medium, a large-volume information storage device can be manufactured without the microfabrication technique as compared to that with the storage medium in which the data is two-dimensionally recorded or is recorded in the small number of layers. Further, the data can be three-dimensionally written and read to/from the solid without using complicated wiring and manufacture processes which are used in a semiconductor memory. Still further, since it is not required to rotate the medium in high speed, a driving device can be simplified as compared to that of a hard disk or an optical disk, and therefore, the power consumption can be reduced. Still further, in the present invention, since the data is written and read to/from the side surface of the storage medium, a height of the cylinder, that is the number of layers, can be increased without causing the decrease of the SN ratio caused in the Patent Document 1 by increasing the number of layers.

Still further, since the width of the parallel rays in the X direction is equal to or larger than the size of the storage are MA in the X direction, the transmissivity in a plurality of points parallel to the diameter direction of the storage area inside the cylindrical medium can be simultaneously obtained. Therefore, the projection images acquired during rotation can be rapidly and collectively obtained in the Z direction, and therefore, the problem that it is difficult to obtain the projection images acquired during rotation as described in the Patent Document 2 does not arise. Besides, by combining with the example of FIG. 6, one sheet of the two-dimensional data can be reproduced by one shot at the certain angle. Still further, since the parallel rays generated by the collimation lens are entered into the side surface of the supporting medium SM parallel to the Z-X plane, the influence of the refraction of the incident light can be reduced.

As described above, in the configuration of FIG. 8, the storage medium is stored in the hole opened in the supporting medium SM. And, the parallel rays are irradiated from the outside of the supporting medium SM, and the projection images are obtained by the light passing through both of the supporting medium SM and the storage medium MM. In such an example, by decreasing the space between the supporting medium SM and the storage medium MM or filling the liquid into the space, the influence of refraction in the space can be avoided. However, depending on the materials of the supporting medium SM and the storage medium MM, it is considered that a process with high accuracy is difficult or there is no filler having a close refractive index. In such a case, an example (FIGS. 9A and 9B) that a lens for correcting an optical path is placed in front or back of the cylindrical storage medium MM or an example (FIGS. 10A and 10B) that the parallel rays are directly irradiated to the storage medium MM shaped in polygonal column such as quadratic prism is effective.

Figure 9A:
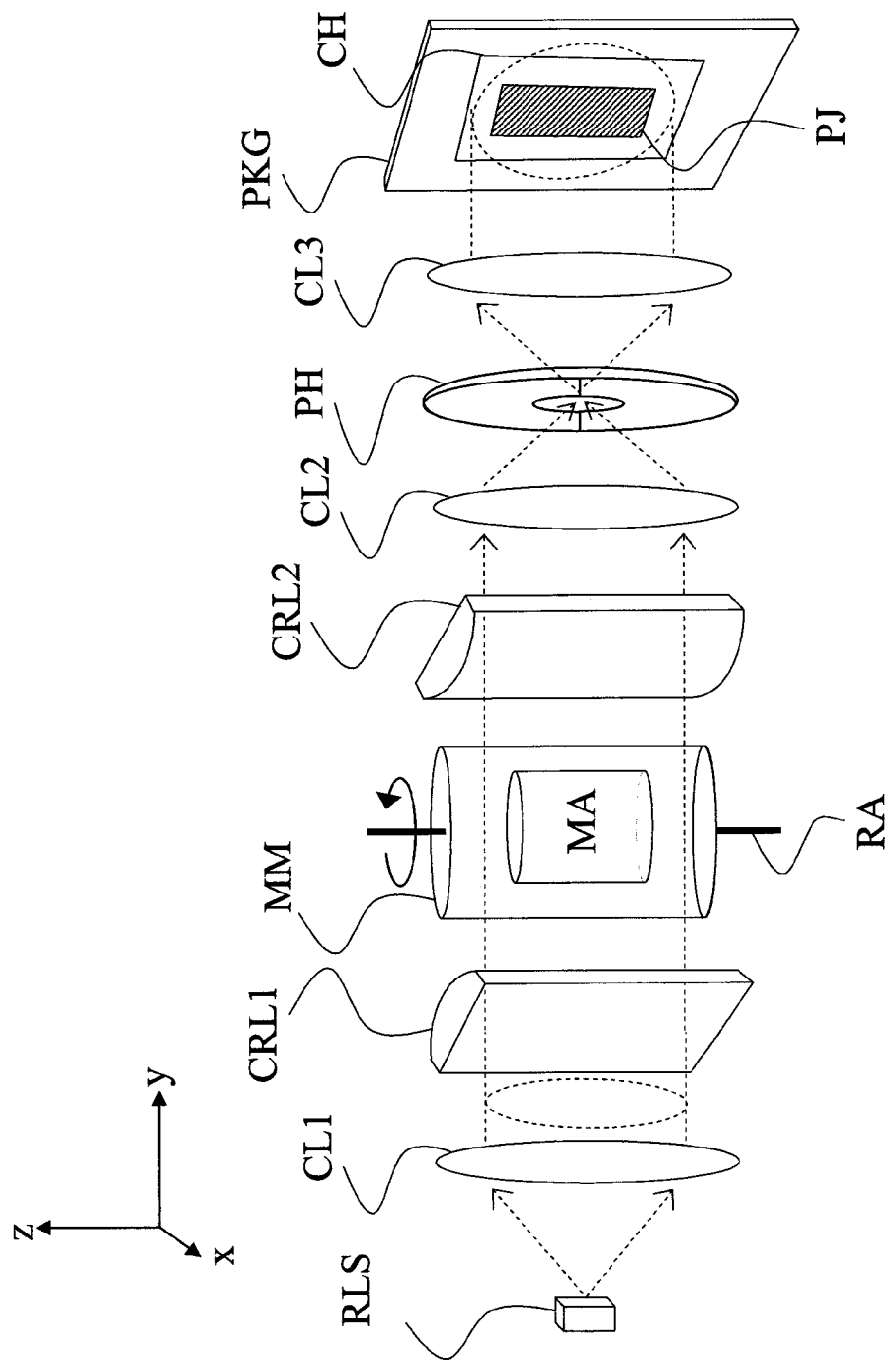
FIG. 9A is an example that illumination light rays are corrected by a lens system in the example illustrated in FIG. 8.
Figure 9B:
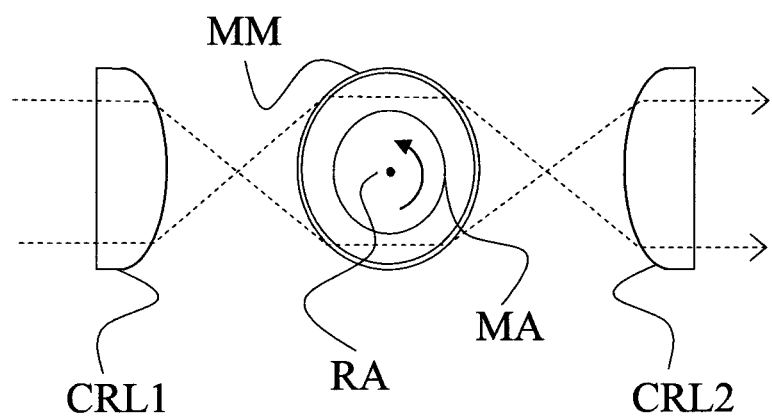
FIG. 9B is the example that the illumination light rays are corrected by the lens system in the example illustrated in FIG. 8.

First, a configuration of the example illustrated in FIGS. 9A and 9B is described. In the example, the illumination light is irradiated from the pinhole and is converted to the parallel rays by the collimation lens CL1. A distance between the pinhole and the collimation lens CL1 is set to equal to the focus distance of the lens CL1. Meanwhile, the storage medium MM is shaped in cylinder, and the data is written in a plurality of small areas inside the storage medium. In a correction lens CRL1 placed in front of the storage medium MM, its one side has a plane surface and the other side has a curved surface such as a part of cylinder. Such a lens is distinguished from the cylindrical lens, and is referred to as one-side cylindrical lens here.

The parallel rays irradiated from the collimation lens CL1 to the above-described correction lens CRL1 are linearly collected to a focus position of the correction lens by refractive effect of the one-side cylindrical lens, and then, is widened again and entered into the storage medium MM. By adjusting the distance between the correction lens CRL1 and the storage medium MM, the light rays passing through the inside of the storage medium MM can be corrected as the parallel rays. The light passing through the inside of the cylindrical storage medium MM as the parallel rays is refracted again on a surface of the cylindrical lens, is linearly collected on a right side of the storage medium MM, is widened again, and is entered into a correction lens CRL2. By adjusting a distance between the correction lens CRL2 and the storage medium MM, the light outputted from the correction lens CRL2 can be converted again to the parallel rays.

In the above description, while the distances between the correction lens CRL1 and the storage medium MM and between the correction lens CRL2 and the storage medium MM depend on a curvature of the lens, the focal distance thereof, the refractive index thereof, or others, how far the distances are to be set can be simply calculated by expressions for paraxial beam, and more specifically, by a general optical-design software. Note that, by forming each correction lens by a plurality of lenses or using an aspherical lens, the light rays passing through the inside of the storage medium MM which is the cylindrical lens can be shaped close to the ideal parallel rays. However, it may be difficult to completely correct the light rays specifically in a vicinity of a surface. In that case, the area where the data is stored only has to be limited in a vicinity of a central axis of the cylinder.

In this manner, there are a merit that the transmitted light whose shape is closer to the parallel can be used, and besides, a merit that, even when the surface of the storage medium MM is broken or is corroded for a long period, the data can be read by polishing and removing the broken or corroded portion and using the lens as a cylindrical lens having a smaller diameter.

The parallel rays outputted from the correction lens CRL2 pass again through a second collimation lens CL2, a pinhole PH, and a third collimation lens CL3, and then, is inputted to the image chip CH. Roles of the collimation lenses CL1 and CL2 and the pinhole PH are, when the parallel rays pass through the inside of the storage medium MM, to cut the scattered light caused by the small areas stored inside the storage medium and the stray light caused by surface reflection of lenses and members which configure the optical system and increase the SN ratio of the projection images.

A distance between the collimation lens CL2 and the pinhole PH is set to equal to a focal distance "f2" of the collimation lens CL2, and a distance between the pinhole PH and the collimation lens CL3 is set to equal to a focal distance "f3" of the collimation lens CL3. In this manner, only the parallel rays among various types of the light rays entered into the collimation lens CL2 pass through the pinhole PH, and therefore, the projection images with the high SN ratio can be imaged by the parallel rays. Also, since the light passing through the pinhole PH returns to the parallel rays by the collimation lens CL3, even when the distance between the image chip CH and the collimation lens CL3 is changed, image magnification is not changed. Note that an image obtained after passing through the correction lens CRL2 is magnified as large as "f3/f2" times a previous image and is projected onto the image chip, and therefore, a desirable magnification can be obtained by changing a ratio of the f3 to the f2. Further, since the light obtained after passing through the CL3 is the parallel rays, an interference filter can be placed in front of the image chip CH. As known well, by obliquely applying the light rays to the interference filter, a transparent wavelength is shifted from a design value. In this manner, the imaging can be performed by using only the monochromatic light having a desirable wavelength, and therefore, the influence of the chromatic aberration can be easily eliminated.

Note that it is needless to say that, if a wavelength used on the light-source side can be limited in the above cases, the projection images can be imaged by eliminating the collimation lens CL3 and placing a camera lens or others in front of the image chip CH. In either way, the parallel rays are provided between the collimation lenses CL1 and CL2, and therefore, it is difficult to cause the image distortion relative to positional shift (shift in a direction parallel to or right crossing the light rays) of a lens group collectively including the correction lenses CRL1 and CRL2 and the storage medium MM, and therefore, there is a merit of easy adjustment of the device.

Figure 10A:
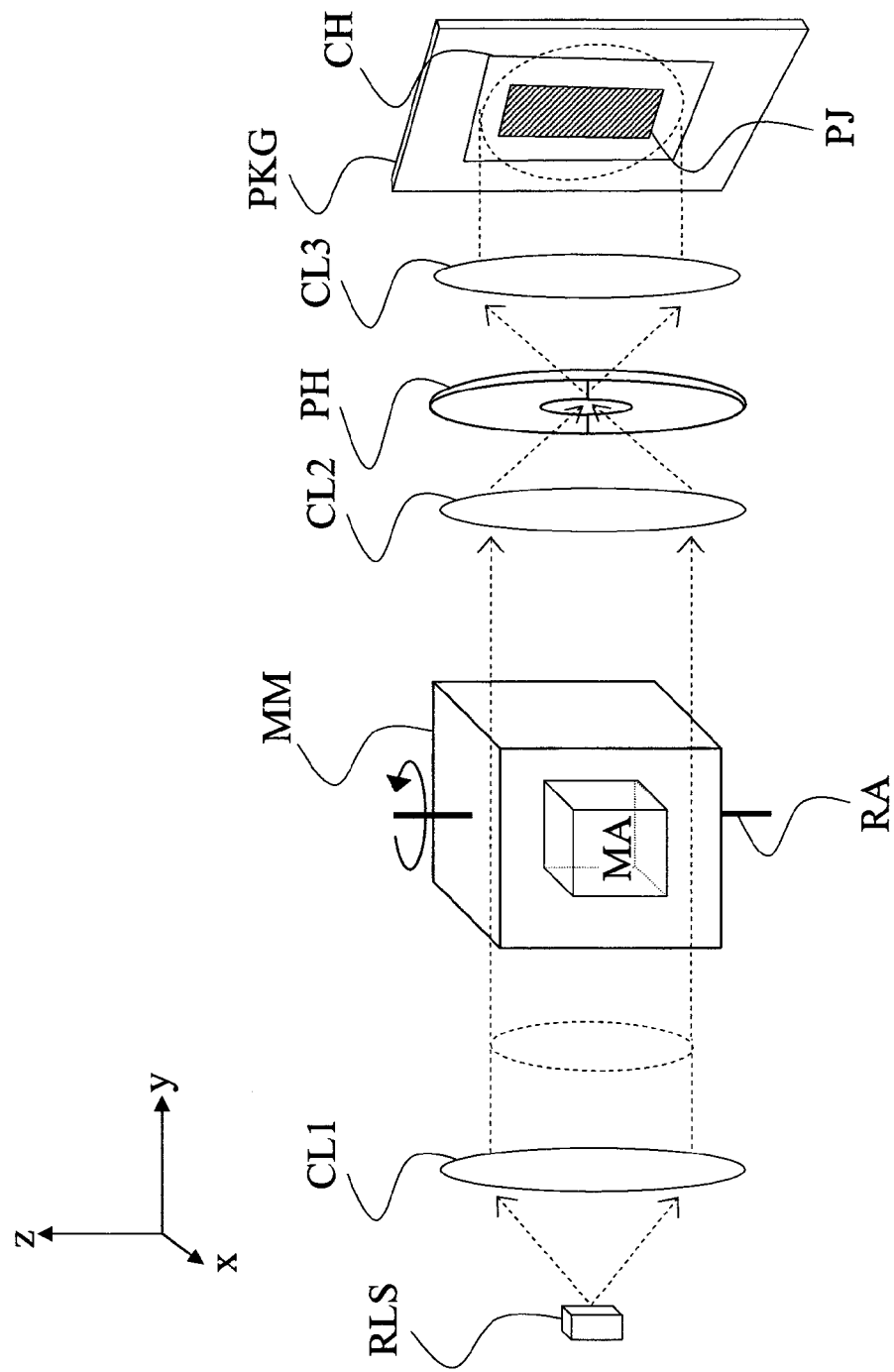
FIG. 10A is an example suitable for using a polygonal-column storage medium in the example of FIGS. 9A and 9B.
Figure 10B:
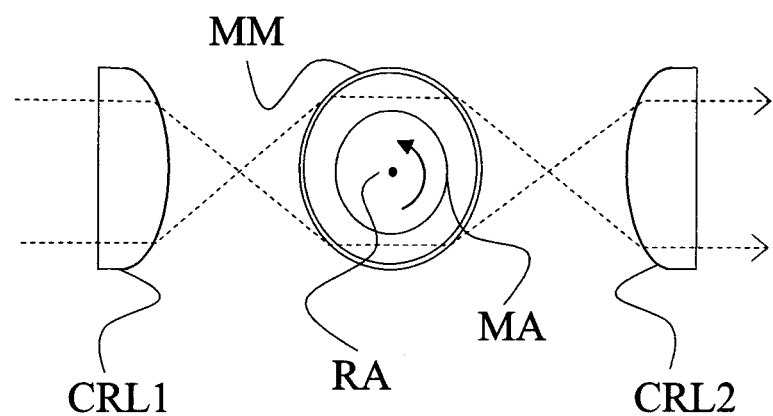
FIG. 10B is the example suitable for using the polygonal-column storage medium in the example of FIGS. 9A and 9B.

Also, depending on a case such that the material for use is difficult to be polished, it may be difficult to use the cylindrical storage medium. In such a case, as illustrated in FIGS. 10A and 10B, a storage medium shaped in polygonal column such as quadratic prism can be used. Since the polishing of the plane is generally easier than the polishing of the cylinder, there is a merit that a degree of freedom of the material for use is increased. Since the correction lens is not used in this example, there are merits that a cost is reduced and the adjustment becomes easier by not using the correction lens. Note that, as seen from geometric optics, when the parallel rays pass through an inclined plate, the angle of the light rays is changed inside the storage medium by the influence of refraction. That is, while the light rays are the parallel rays even inside, the light rays pass through the storage area at a shallower angle than the rotation angle of the medium. Also, a dimension in a direction vertical to the light rays is changed. The change in the angle and the dimension can be easily calculated from the refractive index and the rotation angle of the medium, and therefore, the rotation angle of the projection image is corrected from a physical rotation angle, and the dimension is also corrected, so that the cross-sectional images can be calculated. Note that, outside the medium, the light rays return to the parallel rays in the same direction as that of the incident light. However, by the influence of angle change inside the medium, the images are slightly shifted in a direction right crossing the light rays. Since a degree of the shifting can be also calculated from the refractive index of the storage medium, a thickness thereof, and the rotation angle thereof, the positional shift of the projection images can be corrected by the calculation. Alternatively, by containing an alignment mark in the storage data as a mark, the positional alignment from the imaged projection images can be performed based on the mark.

The above-described influence of refraction depends on a wavelength of the light. Therefore, if the influence is a problem, it is effective to limit a wavelength of the light source, limit an imaged wavelength by the interference filter, or set the wavelength to be shorter. Alternatively, by placing a dummy medium made of the same material and having the same shape as those of the storage medium between the storage medium and the collimation lens CL2 and rotating the dummy medium by only the same angle as that of the storage medium in a reverse direction to the rotation direction thereof, the influence of refraction can be cancelled. In this case, there is a merit that the calculation for the correction is unnecessary.

Figure 11:
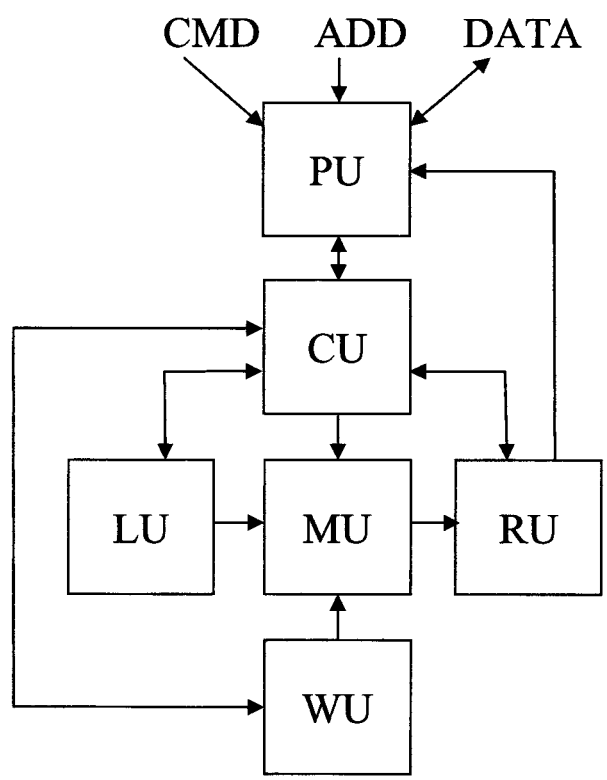
FIG. 11 is a block diagram illustrating a second example of the configuration of the information storage device of the present invention.
Figure 12:
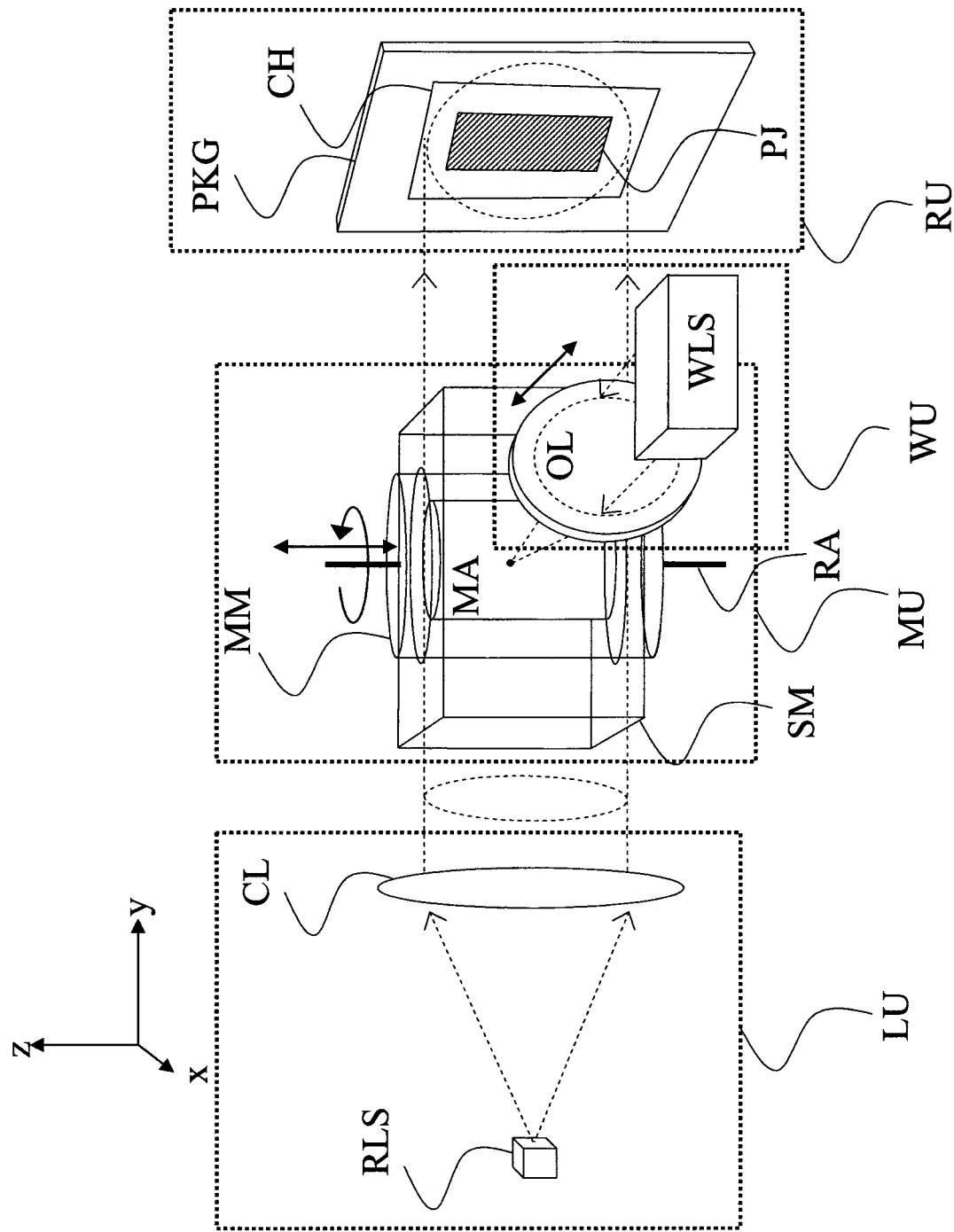
FIG. 12 is an example illustrating a perspective view of principal components of FIG. 11.

With reference to FIGS. 11 and 12, a second example showing a configuration of the present invention is described. While the example described with reference to FIGS. 7 and 8 is for the reading, a feature of the present example is also to include a writing function. When digital video desk is exemplified, the first example describes the device for the reproducing. On the other hand, in the second example, a reproducing and recording device in which the data can be written and an individual user can record movies or others can be configured.

FIG. 11 illustrates a block diagram of principal units in the present example, and FIG. 12 illustrates a perspective view of a specific configuration example. As seen from the comparison of FIG. 11 with FIG. 7, in the present example, a writing unit "WU" is added to the configuration of the example of FIG. 7. The writing unit WU is for writing the data in the memory unit MU.

With reference to FIG. 12, a specific operation is described. Note that the reading operation is the same as that of the example described with reference to FIGS. 7 and 8, and therefore, is omitted, and only the writing operation is described. In FIG. 12, a symbol "WLS" represents a writing light source, and a symbol "OL" is an objective lens. These units configure the writing unit WU in the block diagram of FIG. 11. The light rays radiated from the WLS are collected by the objective lens OL, and are focused inside the storage area MA, so that thermal denaturation occurs in a corresponding small area. In this manner, the data is written.

In order to select small areas which are three-dimensionally placed, the objective lens OL is moved first close to and away from the writing light source WLS, so that the focus can be moved in a direction of connecting between the light source WLS and a center of the objective lens OL. By combining this moving with the moving of rotating the storage medium MM around the RA axis (z axis), the focus can be moved on the x-y plane in this figure. Further, by moving the storage medium MM in the direction of the rotation axis RA, the focus can be moved in the direction of the z axis. By combining these moving methods with each other, the light can be focused on a desirable position inside the storage area MA, and the thermal denaturation can occur in a vicinity of the position. Note that these moving methods are controlled by the control unit CU in accordance with the command "CMD", the address "ADD", and the data "DATA" which are inputted from the outside.

For the writing light source WLS, a laser, more specifically, a short-pulse laser such as femtosecond laser is preferable. When the writing is performed under exposure for short time by collecting such laser light, the thermal denaturation can locally be caused in the small area, and data recording with higher density can be achieved. In the small area where the thermal denaturation is caused, distortion or phase change remains, the refractive index is locally changed, and differences in the light scattering and the absorption property for the transmitted light from circumference occur. Therefore, by taking an area where the thermal denaturation has been caused and an area where it has not been caused as "1" and "0" of information, the digital information can be recorded. Note that, in writing the data, if the area where the thermal denaturation has been already caused exists in the path of the light rays for the writing, the writing may be not sufficiently performed due to weakening the intensity of the light or others. In that case, by selecting a lens whose viewed angle from the focal position to an objective lens is large, that is a lens having a larger NA, or starting the writing of the data from a portion in a vicinity of the rotation axis, the above-described problems can be eased or solved.

In the present example, not only the writing function but also the reading function are provided. By using these functions, the writing can be variously checked. For example, after writing the data, the written data is checked by the reading function, and, if the thermal denaturation for the writing has not been sufficiently caused, the writing can be performed again. Also, by marking on a portion except for the storage area MA for the positional alignment and reading the mark, shift from a coordinate at the writing to a coordinate at the reading can be previously examined. By performing the calculation by the calculating unit PU based on a result of the examination, malfunction due to the influence of aberration of the collimation lens CL for the reading and the objective lens OL for the writing such as distortion can be avoided.

In the above-described example illustrated in FIG. 12, the writing is performed by the writing light source WLS and the objective lens OL from a direction vertical to the rotation axis RA. However, the present invention is not limited to this, and the writing can be performed from, for example, a direction parallel to the rotation axis RA. In that case, the light rays for the writing is entered from a top surface or a bottom surface of the plane-shaped storage medium MM. In this case, by moving the focus in the RA direction by moving the objective lens OL and two-dimensionally moving the WLS and the OL on a plane vertical to the RA, a three-dimensional pattern can be written inside the storage medium MM. In this manner, when a device required for the reading and a device required for the writing are mounted, there is a merit that it is easy to mount them without causing interference with each other.

Hereinafter, in the example of FIG. 12, a function of the calculating unit PU in the data recording in accordance with the method shown on the left side of FIG. 1 is described. First, the calculating unit PU places the data of one layer among the recorded three-dimensional data in the first quadrant of the AX-AY plane as shown in the STEP 1 on the left side of FIG. 1. Next, the STEP 2 is processed, that is, the data flipped over the axis of the AX coordinate is placed in the fourth quadrant. Further, as the STEP 3, the set of the data in the first and fourth quadrants is flipped over the axis of the AY coordinate to be placed in the second and third quadrants. Subsequently, as the STEP 4, the two-dimensional inverse Fourier transform is applied for the data on the two-dimensional plane placed in the STEPS 1 to 3.

The above-described calculation processing is applied for each layer among the recorded three-dimensional data, and the resultant data is recorded in a memory inside the calculating unit PU. At last, the calculating unit PU controls the movement or rotation of the writing light source WLS and the objective lens OL, which configure the writing unit WU, and the storage medium MM, so that the data is written in the storage medium MM.

In the above description, the example of using the light for the data reading has been described. The material deterioration is hardly concerned when a wavelength of the visible light range is used, and therefore, there is a merit that various optical paths can be corrected by using a lens. Obviously, if the material deterioration is not any problem, X rays or others can be also used for the reading device of the present invention. In that case, there is a merit that options of the storage medium are increased because of high transmissivity.

Hereinafter, an example of applying magnetic resonance with using electric waves having a frequency band called radio waves is described. In the example, in spite of a long wavelength, there is a merit that spatial resolution can be improved by using strong magnetic field because a resonant frequency is used. Also, a metal resistant to impact more than glass can be used for the storage medium. The logical details for the nuclear magnetic resonance are described in, for example, the Non-Patent Document 2 or others.

Figure 13:
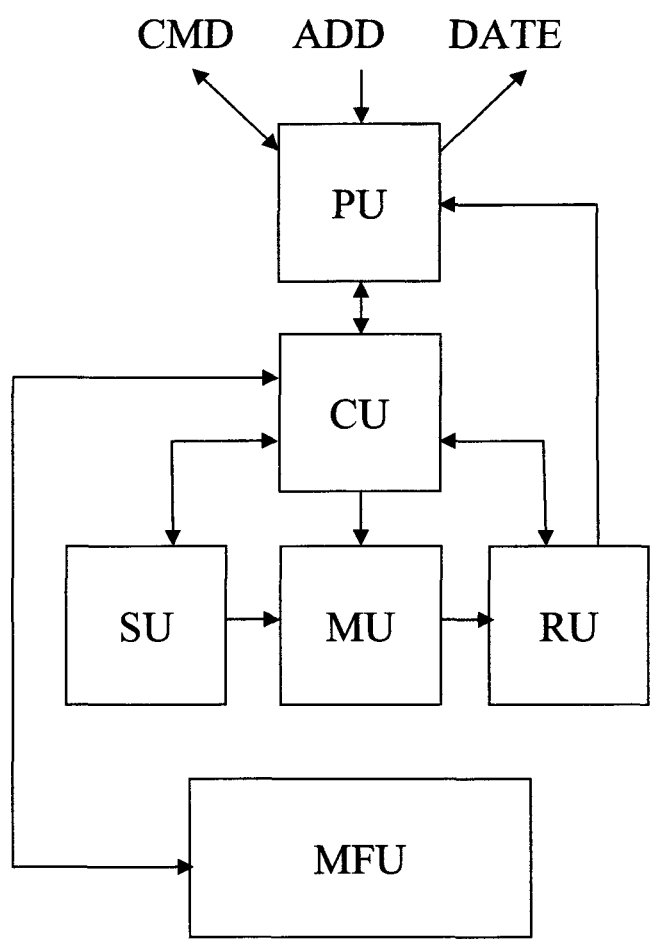
FIG. 13 is a block diagram illustrating a third example of the configuration of the information storage device of the present invention.

FIG. 13 illustrates a block diagram of principal components (hereinafter, each referred to as unit) configuring the example. Arrows illustrated in the block diagram represent flows of data, control signal, and others among blocks. A symbol "CMD" represents the command signal, a symbol "ADD" represents the address, and a symbol "DATA" represents the data.

In FIG. 13, a symbol "MU" represents a memory unit in which the data DATA is stored in three-dimensionally placed small areas. As a shape of the storage medium MM configuring the MU, various shapes such as cylinder, quadratic prism, and plate are considered as illustrated in FIG. 5. A symbol "SU" represents a sending unit, and sends electromagnetic waves to the memory unit MU. A symbol "RU" represents a receiving unit, and receives the electromagnetic waves passing through or radiated from the memory unit MU. A symbol "PU" represents a calculating unit, and processes the receiving signals provided from the receiving unit RU and calculates the placement of the recorded data in the memory unit MU and the value of the data. A symbol "MFU" represents a magnetic-field generating unit and is for providing a required magnetic field to the memory unit. A symbol "CU" represents a control unit, and controls rotation, up/down movement, or inclination of the MU.

In the present example, when the reading command and the address are inputted from the outside to the calculating unit PU, a value of the data corresponding to the inputted address is outputted. The detailed reading operation will be described later. Note that, hereinafter, the descriptions for the methods of generating the electromagnetic waves, the magnetic field, and the electric field, the method of receiving the electromagnetic waves, and the signal processing such as spectral analysis are omitted. These descriptions are mentioned in textbooks of electrotechnology, and a required device can be designed by engineers those who have general knowledge.

Figure 14:
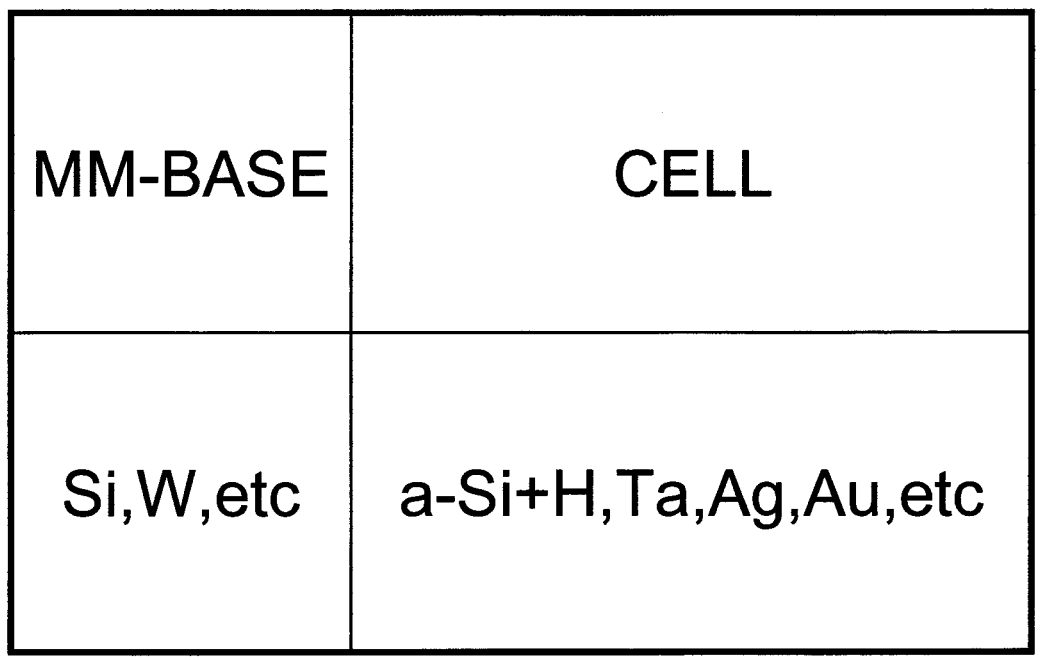
FIG. 14 is an example showing materials for the storage medium suitable for the example of FIG. 13.

FIG. 14 illustrates an example of substances suitable for recording the data in the example of FIG. 13. The present example shows substances in a case that absorption or emission of the electromagnetic waves caused by nuclear magnetic resonance is used for the reading. As materials for the units except for the memory cell of the storage medium MM, silicon (Si), tungsten (W), and others, which do not cause the nuclear magnetic resonance, can be used. The silicon has merits that it is a stable substance and suitable for long-period storage, and besides, is easily obtained because it is massively marketed for integrated circuits.

For the memory cell which is the small area for recording the data, a substance containing an element having the number of neutrons and protons either or both of which are odd numbers, such as hydrogen (H), tantalum (Ta), silver (Ag), and gold (Au) can be used. It is not required to use these elements as a pure element, and, even when they are used as a chemical compound or mixture, only a character such as a resonant frequency is different, and therefore, the resonance phenomenon can be used. Note that, when the hydrogen is used for the memory cell, it is difficult to fix the gaseous hydrogen at a position of the memory cell, and therefore, the hydrogen can be used so as to be bonded with amorphous silicon. The nuclear magnetic resonance is a character which the element essentially has, and the character is not essentially deteriorated, and therefore, the character is suitable for the long-period storage of the data. Also, as the substance forming the memory cell, a substance causing at least one of resonance phenomena of electron spin resonance, ferromagnetic resonance, and anti ferromagnetic resonance in addition to the nuclear magnetic resonance can be used.

As described above, as the material for the units except for the memory cell of the storage medium MM, the material to/from which the absorption or emission of the electromagnetic waves is ignorable or the absorption/emission of the electromagnetic waves is at least small for the memory cell is used, and besides, the material causing the nuclear magnetic resonance for the memory cell is used, so that the information can be stored by using the essential character of the element as the material forming the memory cell, and therefore, the information can be stored in nonvolatile fashion.

However, depending on the combination of the substance forming the memory cell and the substance forming the storage medium, even if they are solid, it is considered that the substance forming the memory cell is diffused in the storage medium, and problems may arise for the reading. In that case, actions such that the combination of substances having a small diffusion coefficient is selected and a barrier layer for preventing the diffusion is provided on the memory cell are effective.

Also, the storage medium MM is uniformly manufactured by using a material to which the substance for the memory cell shown in FIG. 14 is mixed, and the thermal denaturation is locally caused in a portion forming the memory cell, so that the data can be written. As a result of the thermal denaturation, similarly to the phenomenon called chemical shift, the response character of the electromagnetic waves can be changed. Obviously, the element causing the nuclear magnetic resonance does not essentially denature. However, peripheral molecular structures are changed or a local density of the element causing the nuclear magnetic resonance is changed, so that the relaxation time or the intensity of the electromagnetic waves having a specific frequency in an absorption or emission spectrum can be modulated. Therefore, in this case, the same effects can be obtained as that of the case that the substance for units except for the memory cell and the substance for the memory cell are different from each other. Note that, as different from the Patent Document 3, the memory cell obtained by the thermal denaturation stably exists without applying the magnetic field or others from the outside, and therefore, can store the information in nonvolatile fashion. In this case, a type of the material used for the storage medium MM can be one. While the electromagnetic waves are absorbed/emitted to/from an MM-BASE, a difference in the absorption/emission of the electromagnetic waves can be obtained by the thermal denaturation, and therefore, the data can be read.

Note that, in order to generate the above-described local thermal denaturation, a method of using resonant absorption of the electromagnetic waves, a method of locally collecting strong electromagnetic waves such as laser, or others can be used. Since these methods will be described later in an example of FIG. 18B, the descriptions are omitted here.

Figure 15:
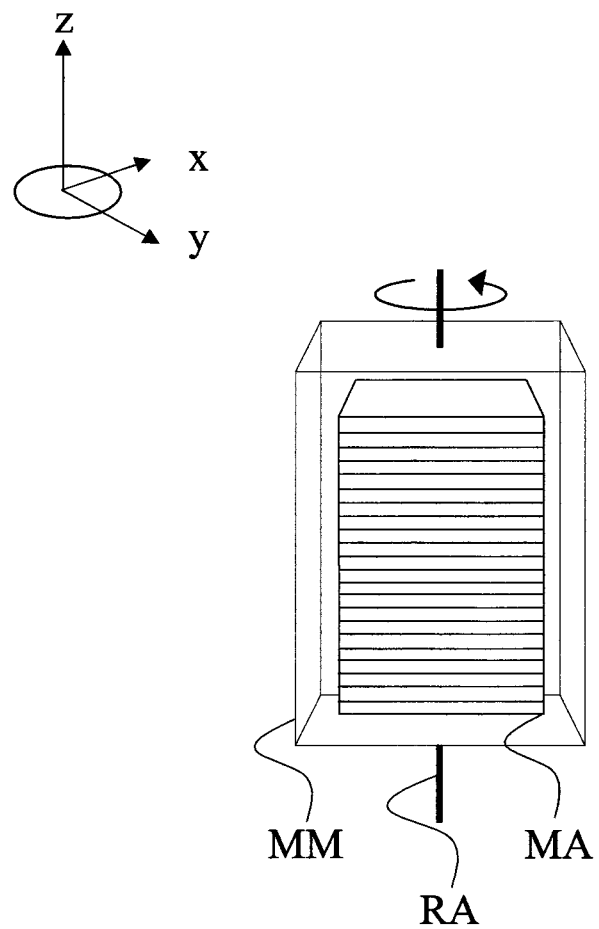
FIG. 15 is an example illustrating a reading method suitable for the example of FIG. 13.
Figure 16:
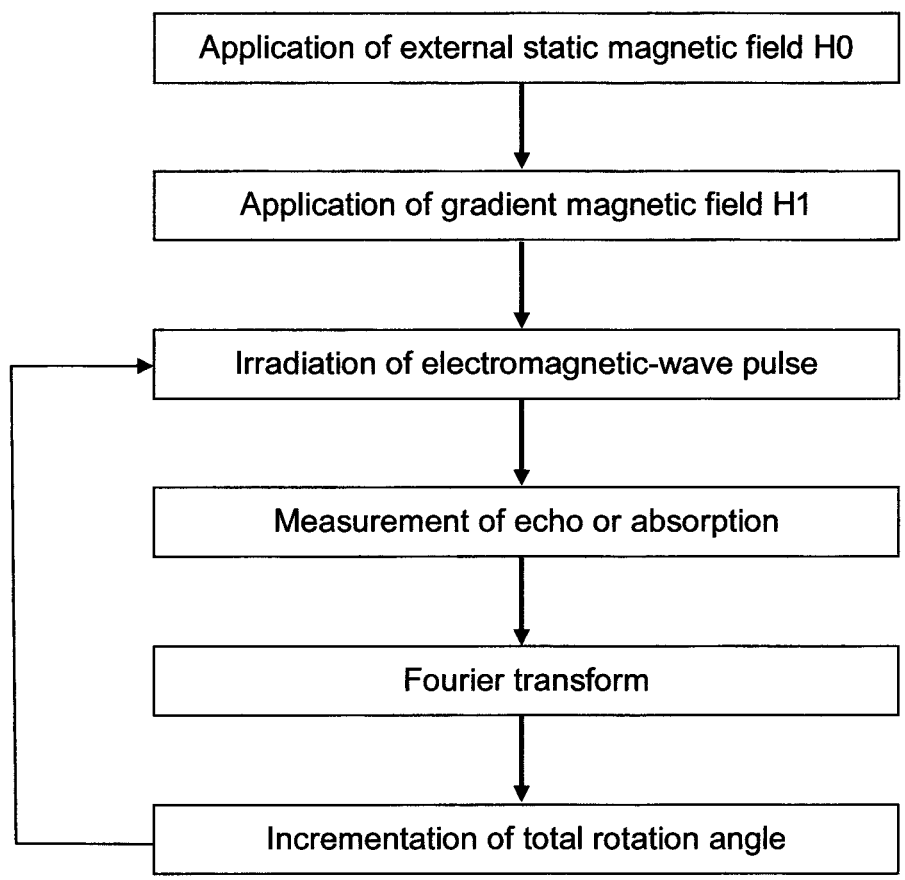
FIG. 16 is an example showing a processing of the reading method suitable for the example of FIG. 13.

Hereinafter, with reference to examples of FIGS. 15 and 16, a method of reading the data by the nuclear magnetic resonance based on the principle of FIG. 1 is described. FIG. 15 illustrates an example of the rotation of the storage medium required for the method, and FIG. 16 shows an example of the reading processing. In FIG. 15, gradient magnetic field having a dependence on only the Z direction and the X direction is applied. For example, when 1000 pieces of the memory cells are placed in each of the X, Y, and Z directions at an equal distance "d", a spatial coordinate dependence of the gradient magnetic field "H" is expressed as follows.

$$H(x,z)=1000(Z/d)+X/d \ (x, z=0 \ \text{to} \ 999d) \quad (1)$$

And, the electromagnetic waves are irradiated from the Y direction. The spectra of the absorbed or emitted electromagnetic waves at that time are obtained, and the data is collected as gradually rotating the storage medium around the Z axis. A component of the specific frequency of the electromagnetic waves observed at certain rotation angle "θ" is obtained by integrating intensities of the absorbed or emitted electromagnetic waves to/from the memory cell in the y axis in the corresponding z-x coordinate, that is in the irradiation direction of the electromagnetic waves. That is, the value mathematically equivalent to the projection image of the computer tomography can be obtained. Here, by rotating the storage medium MM around the z axis, the value of integral in the y direction can be measured during one rotation in each cross-sectional surface vertical to the z axis. If the value of integral can be obtained during the one rotation, the computer tomography with eliminating the two-dimensional inverse Fourier transform at reading the data can be achieved by the example of the present invention of FIG. 1, and therefore, the data can be rapidly read. Note that an example of symmetrically placing the data for applying the example of FIG. 1 is the same as that of the case of using the transmitted light as described above, and therefore, is omitted.

Figure 17:
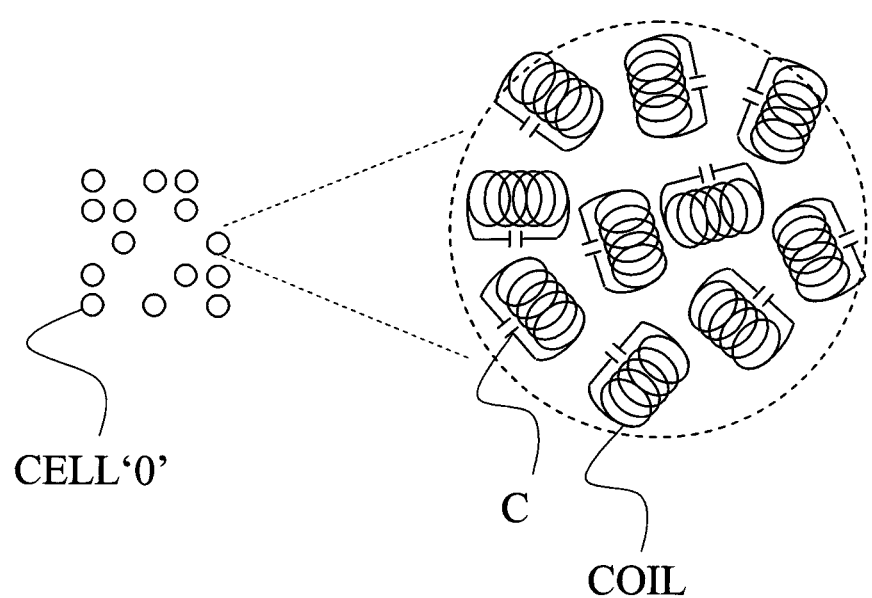
FIG. 17 is an example of a memory cell in which a resonant circuit with using a microcoil suitable for the example of FIG. 13 is used.

Note that, in order to obtain the data having the high SN ratio in the nuclear magnetic resonance, as known well, it is required to apply a strong magnetic field to the storage medium MM. However, depending on cases, it may be difficult to generate the strong magnetic filed because of reasons such as a large apparatus and large power consumption (in a case of an electromagnet). In that case, an example illustrated in FIG. 17 is effective.

In the present example, a resonant circuit formed of a microcoil and a capacitor is included in the memory cell. A micro resonant circuit can be made of, for example, carbon. A method of manufacturing the resonant circuit is described in, for example, the Patent Document 4. Such a micro resonant circuit made of carbon is called carbon microcoil, carbon nanocoil, or others depending on its size. As a resonant frequency with the electromagnetic waves, the optical region can be used for the nano-meter-size carbon nanocoil, and the electric-wave region with a high frequency can be used for the micro-meter-size carbon microcoil, so that the present invention can be applied in accordance with the resonant frequency. The former is studied for the application for a lens having a negative refractive index or others, and the latter is used as, for example, an electromagnetic-wave shield member.

It is required to provide the spatial dependence of the resonant frequency in order to apply the example of FIG. 15 and others. In the microcoil made of carbon, since parasitic capacitance caused by dielectric substance around the coil functions as a capacitor of the resonant circuit, the spatial coordinate dependence of the resonant frequency can be provided by applying the gradient electric field instead of the magnetic field. Note that, instead of applying the gradient electric field, a different number of turns of the coil can be used or a filler for fixing the coil which has a different magnetic permeability from the other can be used in accordance with the spatial coordinate of the memory cell. In this manner, it is not required to generate the gradient electric field, and a unit for generating the electric field can be easily configured.

By including the coil in the memory cell as described above, merits are provided, in which a particular permanent magnet or external magnetic field generated by the electromagnet which consumes a large current is not required. As described above, note that the memory cells are three-dimensionally placed in the storage area MA inside the storage medium MM.

Figure 18A:
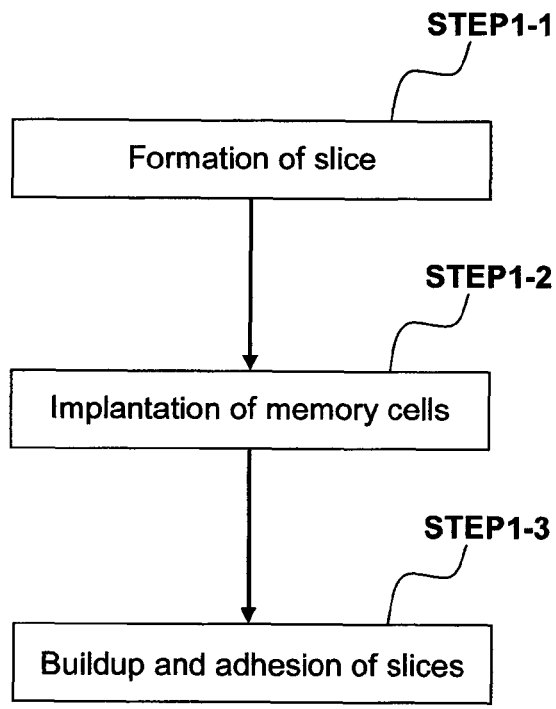
FIGS. 18A and 18B are an example of a method of manufacturing a storage medium MM suitable for the example of FIG. 13.

As a method of manufacturing such a storage medium MM in which the memory cells are three-dimensionally placed, various manufacturing methods are considered. Among the methods, a method by which the manufacturing becomes easy is described with reference to FIG. 18. FIG. 18A shows a manufacturing method in a case that the MM-BASE and the memory cell are made of a different substance from each other. First, a slice of a disk-shaped storage medium is previously prepared as a wafer made of silicon or others (STEP 1-1). Next, a through-hole is opened at a desirable position in the slice to implant a memory cell material shown in FIG. 14 (STEP 1-2). And then, a plurality of the slices in which the memory cell material is implanted in the STEP 2 are built up, and adhered, so that one storage medium MM is provided (STEP 1-3). By manufacturing the storage medium MM as described above, the data can be written in each slice, and therefore, the cost can be reduced if the storage medium is massively manufactured.

Figure 18B:
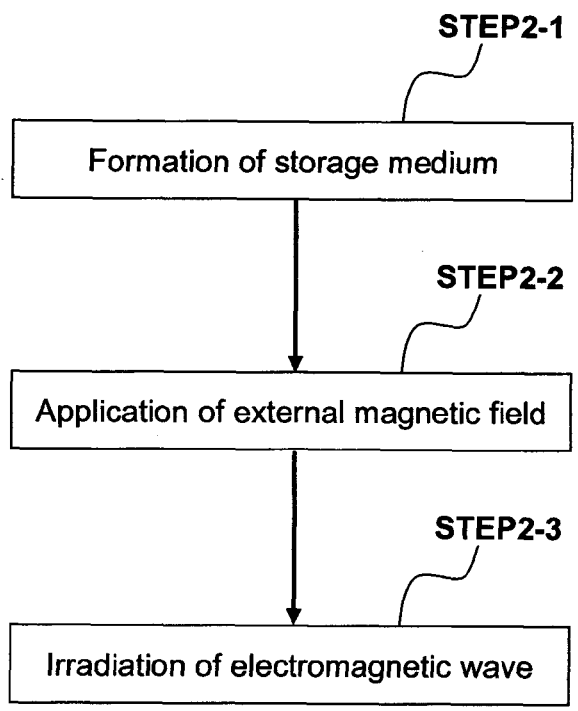

FIG. 18B shows a manufacturing method in a case that the memory cell is formed by the thermal denaturation. First, the storage medium MM is uniformly formed by using the material to which the substance for the memory cell shown in FIG. 14 is mixed (STEP 2-1). Next, by applying the external magnetic field, a state that the resonant frequency inside the storage area MA inside the medium is different in each spatial coordinate is provided (STEP 2-2). And then, in the state, strong electromagnetic waves having a resonant frequency of a memory cell whose data is to be changed are irradiated (STEP 2-3). In this manner, the thermal denaturation can be selectively caused in the memory cell having the resonant frequency.

Note that, instead of using the external magnetic field and the electromagnetic waves, the thermal denaturation can be caused by irradiating the laser. When the external magnetic field and the electromagnetic waves are used, the transmissivity in the substance is high, and therefore, an optional range of the substance used for the storage medium MM can be widened. On the other hand, when the laser is used, a substance through which the laser passes is required for the substance for the storage medium MM, and therefore, the optional range of the material is narrowed. However, by controlling a lens position for collecting the laser, the data can be written in a required portion, and therefore, a merit of easy writing is provided. In the case of the laser, by collecting the light such as a short-pulse laser, more particularly, femtosecond laser, the thermal denaturation can be caused even inside a medium through which a wavelength of the laser passes.

In the foregoing, according to the examples of using the magnetic resonance as described above from FIG. 13, since the data is three-dimensionally stored, the highly-integrated storage can be achieved without relying on the microfabrication as compared with the two-dimensional storage such as a general semiconductor storage device. Also, as different from the method described in the Patent Document 3, the memory cell is preserved as the different substance from that of the storage medium MM, and therefore, the data can be stored in nonvolatile fashion even without the external magnetic field. Further, the data is stored so as to be closed inside the solid-like medium, and the data is read with contactless, and therefore, the data can be stored for a long period. That is, as long as the storage medium is stored in a case for shielding the electromagnetic waves, the data is not lost due to a normal temperature or humidity. Even if a surface of the storage medium is scratched or corrosion of mold or others is caused on the surface, the information can be read by polishing its portion. Therefore, the information storage device according to the present invention is suitable for storing the data of valuable images, documents, and cultural properties for a very-long period as a digital data. Also, similarly to the example of using the light as described in the earlier part of the specification, the calculation processing at reproducing the data can be reduced, and therefore, the data can be rapidly reproduced.

FIG. 1 illustrates one example for simplifying the calculation of the computer tomography, and the method of achieving the example has been explained. Hereinafter, another method is explained. This method can be combined with the example of FIG. 1, or the independent application of this method to a conventional computer tomography is also effective. Note that, in the example of FIG. 1, the data obtained after applying the two-dimensional inverse Fourier transform is recorded. Therefore, even if the original data is binary of "1" and "0", the recorded data becomes multiple values. Depending on the material for the storage medium, the recording of the multiple values may be difficult. In such a case, by providing the recorded data as the binary, the following example may be applied for a normal computer tomography. A specific example is illustrated in FIG. 19.

Figure 19A:
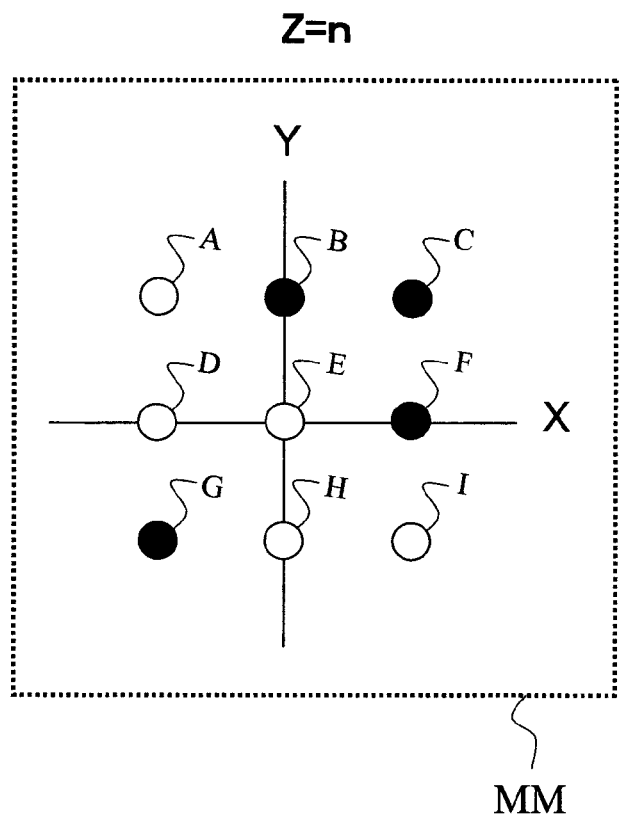
FIGS. 19A and 19B are an example that, by multiply storing the same data as changing an angle, a calculation processing amount for the reading can be reduced or projection images of blind areas can be obtained.
Figure 19B:
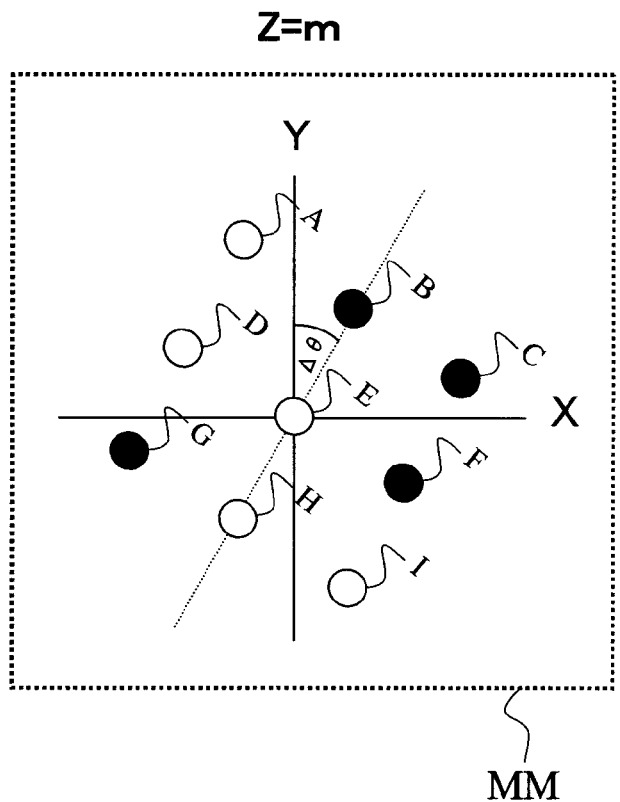

In the example, the stored data is multiply recorded in different layers of the storage medium, and each rotation angle is previously changed. In FIGS. 19A and 19B, the same data is rotated by an angle of Δθ. By writing these data in the different layer from each other, when a projection image is imaged once at a specific angle, projection images at the angle and after the rotation by the angle of Δθ from the angle can be obtained at the same time. Therefore, by using the small number of angles, the projection images at the large number of angles can be obtained. Obviously, a storage capacity per a volume is decreased by the decrease of the number of angles. However, the reading can be rapidly performed, and besides, the example is particularly effective for the following cases.

For example, the case is that the rotation angle of the storage medium is mechanically limited. If there are a stay and others as components for supporting the storage medium in the examples illustrated in FIGS. 9A and 9B and FIGS. 10A and 10B, there is a possibility that the imaging cannot be performed in directions of the components. Also, in the case of using the polygonal column or others as illustrated in FIGS. 10A and 10B, an angle of a surface at a corner of the medium is discontinuously changed in the rotation of the medium, and therefore, the projection images cannot be imaged. Further, since a refractive index of a normal solid is higher than that of air, total reflection is caused in the light emission from the storage medium to air when the rotation angle is larger than a certain angle. Therefore, in the surface, the projection images cannot be imaged at the certain angle or larger. From the above-described limitation, particularly in the case of the projection images acquired during rotation by using the plate-shaped or polygonal-column-shaped storage medium, the angles at which the imaging cannot be performed adversely exist.

When the projection image at the certain angle cannot be obtained, a two-dimensional Fourier component in a direction of the angle is lacked in the calculation for the computer tomography, and therefore, resolution in a specific direction is lowered in the calculation for the cross-sectional images. If the lack of the component is a problem, by multiply writing the data having the different rotation angle, the data at the angle at which the imaging cannot be normally performed can be obtained, and therefore, the result of the tomographic calculation for the computer tomography is improved. Note that it may be not desirable to multiply write the same data as changing the angle as described above because the writing time is increased or others. In such a case, it may be devised that the writing data in the direction of the lowered resolution is roughly provided as compared to those in the other directions. For example, when the plate-shaped material is used for the storage medium, the storage areas are finely placed in a parallel direction to a surface of the plate, and are roughly placed in a direction of a right angle thereto, so that the data can be written.

In the examples described above, the storage data is three-dimensionally placed in the solid, and the coordinate of the data is obtained by the response of the light or the radio waves and the calculation. At this time, it is convenient to record the data which is a reference of the coordinate as a mark in addition to the normal data. For example, a mark which is a reference of a starting point or an ending point of the rotation angle, a mark which is a reference of the rotation axis, a mark representing a region of the storage area of the data or a layer number, or others can be stored at a desirable position by the same method with the data. By providing these marks, they are not only the references for mounting the medium on the reading device but also reference data used when the data obtained by reading the lens aberration, the error of the inclination of the applied magnetic field, or others is corrected by the calculation.

Also, in the examples described above, the placement that the small areas for storing the information are away from each other is exemplified. However, the areas may be placed as a continuous area, or only areas in a specific-dimensional direction of the three-dimensional placement may be placed away from each other. For example, it is considered that a well-known two-dimensional barcode is placed in a multilayer form. In the case that the areas are continuously placed, there is a merit of a higher density.

In the foregoing, the invention made by the inventors of the present invention has been concretely described based on the embodiments. However, it is needless to say that the present invention is not limited to the foregoing embodiments and various modifications and alterations can be made within the scope of the present invention.

In the information storage device according to the present invention, the storage density can be improved by three-dimensionally placing the memory cells. Also, since the storage area MA is closed inside the storage medium MM which is solid, the information robustness and long-period storage can be achieved. Further, by applying the two-dimensional inverse Fourier transform for each layer at the recording, the calculation amount at the reproducing is reduced. Incidentally, the information is placed and recorded so that the information can be correctly restored at reproducing the recorded data from not all projection images acquired during one rotation but only the projection images at a part of angles. Therefore, the calculation processing related to the reproducing of the recorded information can be reduced, and the rapid reproducing can be achieved. From the above descriptions, the present invention can be used for storing image, voice, and text data of, for example, official documents or cultural properties for which the long-period storage is required or for storing the gene information of rare species of living beings or others which are endangered, and handing the data or information down to the following generations.

Note that, by adding the metadata containing a title showing created date and time or storage content, a creator, a reading method, or others into the storage medium according to the present invention, it becomes convenient to found out the information related to the storage content even if a long period passes after the creation. It is needless to say that the metadata can be written in the storage medium in a format which can be read by the methods of the above-described examples or can be recorded as an understandable character pattern or design which is easily recognized. Note that, particularly in the information related to the date and time, there is a possibility that correspondence of the current Christian era to a new calendar in far future is unclear. In such a case, for example, a position of a star or planet or an astronomical event such as solar eclipse may be stored together with the Christian era. As the position of the star, a relative position or a position from the celestial north pole is changed during several hundreds of years to several thousands of years by a proper motion of the star and precession of the earth. And, as the position of the planet, a position relative to the star is daily changed by the earth revolution whose period is about one year and the planet own revolution whose period is several years to several tens of years. By further adding the information such as the solar eclipse in addition to these pieces of information, the date and time can be considerably correctly estimated.

Also, in the examples of FIGS. 10A and 10B or others, it has been described that it is convenient to write the alignment mark for referring the position into the storage medium. It is needless to say that the alignment mark can be applied for other examples of the storage medium. Further, by recording a plurality of the alignment marks at appropriate positions of the storage medium as not only the reference point for the coordinate but also the reference point for the rotation or the data density, for example, the aberration of the optical system, the shape error of the medium, the writing and reading variations in the dot density depending on the position in the medium, or others can be corrected, and therefore, the higher-reliable information recording and reading can be achieved.

Description Of Symbols

CMD: command, ADD: address, DATA: data, RU: receiving unit, WU: writing unit, MU: memory unit, LU: lighting unit, CU: control unit, PU: calculating unit, MM: storage medium, MA: storage area, Mai: cross-sectional slice of the storage area, SM: supporting medium, RLS: reading light source, WLS: writing light source, CL, CL1, CL2, and CL3: collimation lenses, OL: objective lens, CRL1 and CRL2: correction lenses, RA: rotation axis, CH: image chip, PKG: package, PJ: projection image, CELL, CELL "1", and CELL "0": memory cells, MFU: magnetic-field generating unit, COIL: coil, and C: capacitor.

The invention claimed is:

1. An information processor device comprising:
a lighting unit for irradiating electromagnetic waves to a storage medium which stores data in a plurality of three-dimensionally placed small areas, the data being obtained by applying a two-dimensional inverse Fourier transform for data placed on an axis of a first coordinate and transforming the data onto an axis of a second coordinate;
a receiving unit for receiving the electromagnetic waves passing through the storage medium; and
a calculating unit for calculating information obtained in the receiving unit and outputting data corresponding to a request from an outside, wherein
the calculating unit calculates based on the information obtained in the receiving unit to obtain positional information of the data placed on the axis of the first coordinate, and
the calculating unit calculates a one-dimensional Fourier transform for the information obtained in the receiving unit to obtain the positional information of the data placed on the axis of the first coordinate.

2. The information processor device according to claim 1, wherein
the receiving unit receives a plurality of pieces of information obtained by rotating the storage medium by each certain angle, and
the receiving unit obtains the data on the axis of the first coordinate based on the plurality of pieces of information.

3. The information processor device according to claim 1, wherein
the storage medium has a rotation axis, and stores a set of a data group as dividing the set of the data group in a direction of the rotation axis.

4. The information processor device according to claim 1, wherein
at least a part of wavelength of a component of the electromagnetic waves is included in a region from ultraviolet rays to infrared rays.

5. The information processor device according to claim 1, wherein
at least a part of wavelength of a component of the electromagnetic waves is included in a region of X rays.

6. The information processor device according to claim 1, wherein
at least a part of wavelength of a component of the electromagnetic waves is included in a region of radio waves.

7. The information processor device according to claim 1, wherein
the storage medium is made of fused silica or aluminum oxide.

8. The information processor device according to claim 1, wherein
- the information processor device further includes a writing unit for writing the information in the storage medium, and
- the calculating unit applies two-dimensional inverse Fourier transform for the data inputted from the outside and placed on the axis of the first coordinate to transform the data onto the data on the axis of the second coordinate.

9. The information processor device according to claim 1, wherein
- the data placed on the axis of the first coordinate is line-symmetrically placed in four regions divided by a first central axis of the axis of the first coordinate and a second central axis crossing the first central axis.

* * * * *